United States Patent
Kato et al.

(10) Patent No.: US 9,580,651 B2
(45) Date of Patent: Feb. 28, 2017

(54) ORGANIC COMPOUND, LIQUID CRYSTAL COMPOSITION, LIQUID CRYSTAL ELEMENT, AND LIQUID CRYSTAL DISPLAY DEVICE

(71) Applicant: SEMICONDUCTOR ENERGY LABORATORY CO., LTD., Atsugi-shi, Kanagawa-ken (JP)

(72) Inventors: Momoko Kato, Fukushima (JP); Yasuhiro Niikura, Kanagawa (JP); Makoto Ikenaga, Kanagawa (JP); Manabu Kobayashi, Tokyo (JP); Tetsuji Ishitani, Kanagawa (JP)

(73) Assignee: Semiconductor Energy Laboratory Co., LTD., Kanagawa-ken (JP)

( * ) Notice: Subject to any disclaimer, the term of this patent is extended or adjusted under 35 U.S.C. 154(b) by 0 days.

(21) Appl. No.: 14/336,104

(22) Filed: Jul. 21, 2014

(65) Prior Publication Data

US 2015/0038722 A1 Feb. 5, 2015

(30) Foreign Application Priority Data

Jul. 30, 2013 (JP) ................ 2013-157905
Jul. 30, 2013 (JP) ................ 2013-157912

(51) Int. Cl.
*C09K 19/30* (2006.01)
*C09K 19/34* (2006.01)
*C09K 19/12* (2006.01)

(52) U.S. Cl.
CPC .......... *C09K 19/3003* (2013.01); *C09K 19/12* (2013.01); *C09K 19/3098* (2013.01); *C09K 19/3444* (2013.01); *C09K 19/3455* (2013.01); *C09K 2019/123* (2013.01); *C09K 2019/3016* (2013.01)

(58) Field of Classification Search
None
See application file for complete search history.

(56) References Cited

U.S. PATENT DOCUMENTS

| | | |
|---|---|---|
| 4,330,426 A | 5/1982 | Eidenschink et al. |
| 4,505,838 A | 3/1985 | Roemer et al. |
| 4,544,771 A | 10/1985 | Roemer et al. |
| 4,695,131 A | 9/1987 | Balkwill et al. |
| 5,213,710 A | 5/1993 | Reiffenrath et al. |
| 5,550,236 A | 8/1996 | Schlosser et al. |
| 7,718,086 B2 | 5/2010 | Takaku et al. |
| 7,846,514 B2 | 12/2010 | Shimada |
| 7,951,433 B2 | 5/2011 | Tanaka |
| 2008/0099724 A1 | 5/2008 | Takaku et al. |
| 2010/0073621 A1 | 3/2010 | Shimada |
| 2010/0127211 A1 | 5/2010 | Tanaka |
| 2011/0090183 A1 | 4/2011 | Yamazaki et al. |

FOREIGN PATENT DOCUMENTS

| | | |
|---|---|---|
| CN | 101616883 A | 12/2009 |
| DE | 2927277 | 1/1981 |
| DE | 3036717 | 4/1981 |
| DE | 3208089 | 9/1983 |
| DE | 4203719 | 8/1993 |
| DE | 4236103 | 4/1994 |
| DE | 4338267 | 5/1995 |
| EP | 0022183 A | 1/1981 |
| EP | 0088907 A | 9/1983 |
| EP | 0115429 A | 8/1984 |
| EP | 0117631 A | 9/1984 |
| EP | 1916279 A | 4/2008 |
| EP | 2116522 A | 11/2009 |
| EP | 2123623 A | 11/2009 |
| GB | 2060680 A | 5/1981 |
| JP | 56-012322 A | 2/1981 |
| JP | 56-077231 A | 6/1981 |
| JP | 58-162549 A | 9/1983 |
| JP | 60-069045 A | 4/1985 |
| JP | 60-069046 A | 4/1985 |
| JP | 06-228037 A | 8/1994 |
| JP | 06-298685 A | 10/1994 |
| JP | 08-501107 | 2/1996 |
| JP | 2736172 | 4/1998 |
| JP | 2000-026352 A | 1/2000 |

(Continued)

OTHER PUBLICATIONS

Database CAPLUS in STN, Acc. No. 1915:19490, Mieleitner, Zeitschrift fuer Kristallographie und Mineralogie (1915), 55, pp. 51-87 (abstract).*
Database CAPLUS in STN, Acc. No. 1970:487535, Scola et al., Industrial & Engineering Chemistry Product Research and Development (1970), 9(3), pp. 413-419 (abstract).*
Database in CAPLUS in STN, Acc. No. 2001:676069, Yao et al., Chinese Science Bulletin (2001), 46(15), pp. 1277-1281 (abstract).*
Database CAPLUS in STN, Acc. No. 1998:568790, De Meijere et al., WO 9835924 A1 (Aug. 20, 1998) (abstract).*
Diekmann.K at al., "Nucleus growth in liquid crystals", Liquid Crystals, 1998, vol. 25, No. 3, pp. 349-355.

(Continued)

*Primary Examiner* — Brian J Davis
(74) *Attorney, Agent, or Firm* — Nixon Peabody LLP; Jeffrey L. Costellia

(57) ABSTRACT

An organic compound represented by General Formula (G100) is provided. A novel liquid crystal composition containing the organic compound is provided.

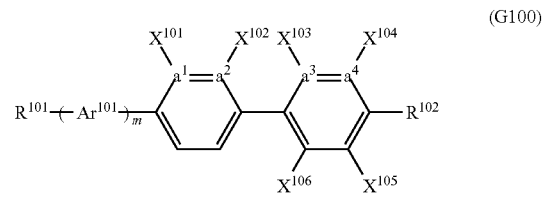

8 Claims, 13 Drawing Sheets

(56) References Cited

FOREIGN PATENT DOCUMENTS

| | | |
|---|---|---|
| JP | 2008-106200 A | 5/2008 |
| JP | 2009-292730 A | 12/2009 |
| JP | 2011-141522 A | 7/2011 |
| JP | 5299265 | 9/2013 |
| KR | 0147697 | 8/1998 |
| KR | 2009-0101952 A | 9/2009 |
| KR | 2009-0114420 A | 11/2009 |
| TW | 200844216 | 11/2008 |
| TW | 200848499 | 12/2008 |
| WO | WO-94/10105 | 5/1994 |
| WO | WO-95/13257 | 5/1995 |
| WO | WO-2008/090780 | 7/2008 |
| WO | WO 2008/105286 | 9/2008 |

OTHER PUBLICATIONS

Lakshmi Praveen.P et al., "Effect of Substituents on Electronic Spectral Shifts and Phase Stability of Liquid Crystalline Biphenylcyclohexane Molecules—A Theoretical Approach", Mol. Cryst. Liq. Cryst. (Molecular Crystals and Liquid Crystals), 2012, vol. 557, No. 1, pp. 206-216, Taylor & Francis.
International Search Report (Application No. PCT/JP2014/069270) Dated Oct. 21, 2014.
Written Opinion (Application No. PCT/JP2014/069270) Dated Oct. 21, 2014.

\* cited by examiner

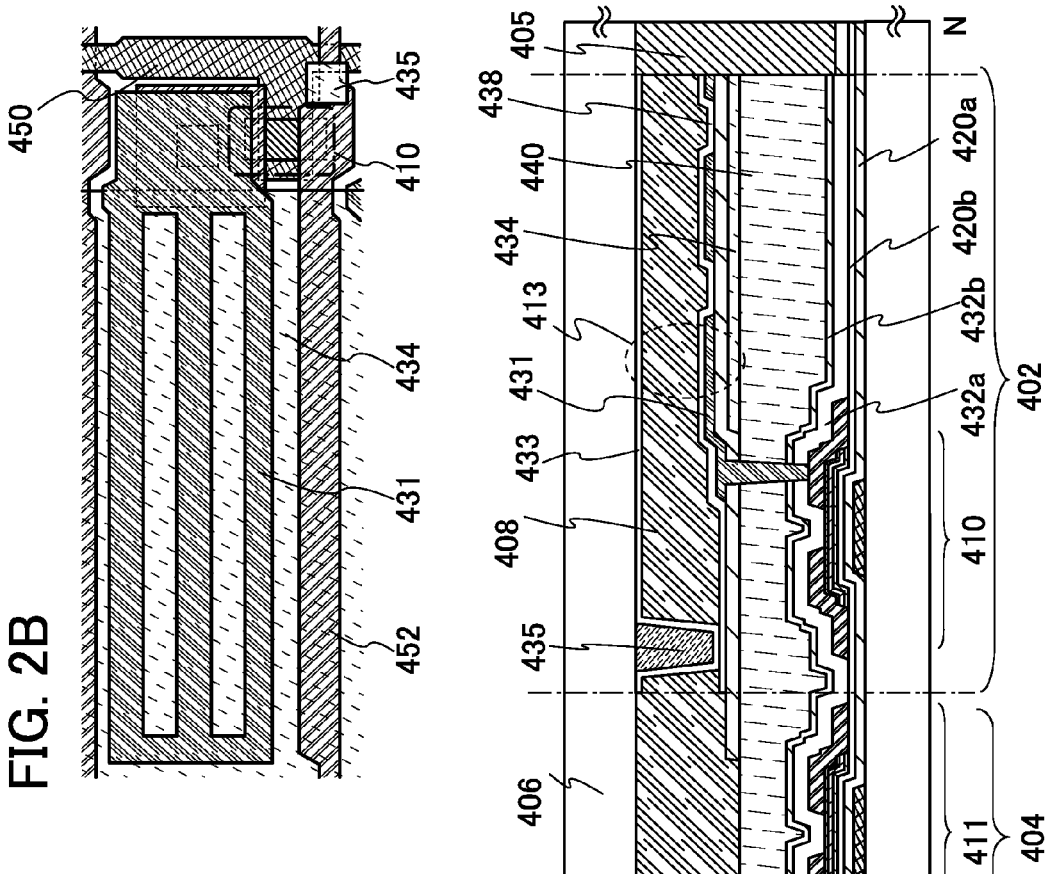

ORGANIC COMPOUND, LIQUID CRYSTAL COMPOSITION, LIQUID CRYSTAL ELEMENT, AND LIQUID CRYSTAL DISPLAY DEVICE

TECHNICAL FIELD

The present invention relates to an object, a method, or a manufacturing method. In addition, the present invention relates to a process, a machine, manufacture, or a composition of matter. In addition, one embodiment of the present invention relates to a semiconductor device, a display device, a driving method thereof, or a manufacturing method thereof. In particular, one embodiment of the present invention relates to a novel organic compound, a liquid crystal composition containing the novel organic compound, a liquid crystal element, a liquid crystal display device, and manufacturing methods thereof.

BACKGROUND ART

In recent years, liquid crystals have been used in a variety of devices; in particular, liquid crystal display devices (liquid crystal displays) having advantages of thinness and lightness have been used for displays in a wide range of fields.

Low power consumption is an added value required of a liquid crystal display device. For example, in an active matrix liquid crystal display device, a transistor with low off-state current is used as a transistor having a function of applying voltage to a liquid crystal element; thus, data is rewritten at longer time intervals (a refresh rate is reduced) in a period during which one image (still image) is displayed, and power consumption is reduced (Patent Document 1).

REFERENCE

Patent Document

[Patent Document 1] Japanese Published Patent Application No. 2011-141522

DISCLOSURE OF INVENTION

To reduce power consumption of a liquid crystal display device, leakage of electrical charges accumulated between electrodes of a liquid crystal element needs to be as little as possible. This is because the leakage of electrical charges causes a change in voltage applied to a liquid crystal layer, resulting in a change in the transmittance of a pixel.

Particularly in driving of the liquid crystal display device at a low refresh rate, change in a still image over time needs to be prevented from being recognized by a user. However, when a change in voltage applied to the liquid crystal layer is bigger than that allowed as a deviation in a gray scale for displaying one image, a user perceives a flicker of the image, which means a decrease in display quality.

To reduce the leakage of electrical charges, an element with a high voltage holding ratio (VHR) is preferably used as the liquid crystal element in the liquid crystal display device. In addition, the use of the liquid crystal element with a high voltage holding ratio enables the liquid crystal display device to have high contrast.

A factor that influences the voltage holding ratio of a liquid crystal element is a decrease in the number of electrical charges due to a capacitance (C)-resistance (R) time constant of a liquid crystal layer. For this reason, the use of a material with high resistivity as a liquid crystal composition included in the liquid crystal layer can increase the voltage holding ratio of a liquid crystal element including the liquid crystal composition.

In view of the above, an object of one embodiment of the present invention is to provide a novel organic compound that can be used in a variety of liquid crystal devices.

Another object of one embodiment of the present invention is to provide a liquid crystal composition containing the novel organic compound and a liquid crystal element or a liquid crystal display device formed using the liquid crystal composition.

Another object of one embodiment of the present invention is to provide a liquid crystal composition with high resistivity. Another object of one embodiment of the present invention is to provide a liquid crystal element with a high voltage holding ratio.

Another object of one embodiment of the present invention is to provide a liquid crystal display device which consumes less power.

Note that the descriptions of these objects do not disturb the existence of other objects. In one embodiment of the present invention, there is no need to achieve all the objects. Objects other than the above objects will be apparent from and can be derived from the description of the specification and the like.

One embodiment of the present invention is an organic compound represented by General Formula (G100) below.

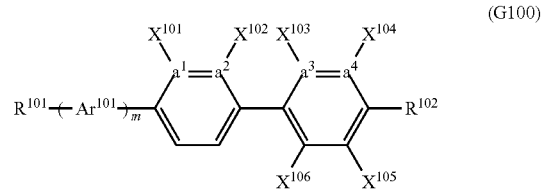

(G100)

In General Formula (G100), $Ar^{101}$ represents any one of a phenylene group, a cycloalkylene group, and a cycloalkenylene group. $R^{101}$ represents any one of a hydrogen atom, an alkyl group having 1 to 11 carbon atoms, and an alkoxy group having 1 to 11 carbon atoms. $R^{102}$ represents any one of a hydrogen atom, a fluorine atom, an alkyl group having 1 to 11 carbon atoms, and an alkoxy group having 1 to 11 carbon atoms. In addition, m is 0 or 1. Furthermore, $a^1\text{-}X^{101}$, $a^2\text{-}X^{102}$, $a^3\text{-}X^{103}$, and $a^4\text{-}X^{104}$ separately represent any one of C—H, C—F, C—$CH_3$, and N. $X^{105}$ and $X^{106}$ separately represent any one of a hydrogen atom, a fluorine atom, and a methyl group. Note that 0 or more and 3 or less of $X^{101}$ to $X^{106}$ each represent a fluorine atom.

Another embodiment of the present invention is an organic compound represented by General Formula (G10).

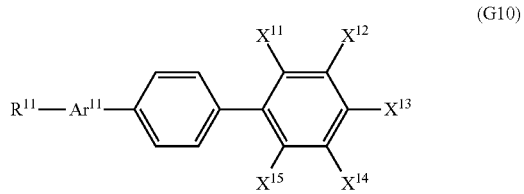

(G10)

In General Formula (G10), $Ar^{11}$ represents any one of a phenylene group, a cycloalkylene group, and a cycloalkenylene group, and $R^{11}$ represents any one of an alkyl group having 2 to 11 carbon atoms and an alkoxy group having 2 to 11 carbon atoms. $X^{11}$ and $X^{15}$ separately represent any one of a hydrogen atom, a fluorine atom, and a methyl group. $X^{12}$ to $X^{14}$ separately represent any one of a hydrogen atom and a fluorine atom. Note that when one of $X^{11}$ and $X^{15}$ represents a methyl group, the other of $X^{11}$ and $X^{15}$ also represents a methyl group, and 0 or more and 2 or less of $X^{11}$ to $X^{15}$ each represent a fluorine atom.

Another embodiment of the present invention is an organic compound represented by General Formula (G11).

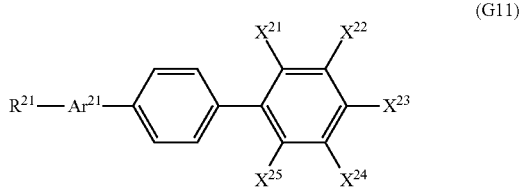

(G11)

In General Formula (G11), $Ar^{21}$ represents any one of a phenylene group, a cycloalkylene group, and a cycloalkenylene group, and $R^{21}$ represents any one of an alkyl group having 2 to 11 carbon atoms and an alkoxy group having 2 to 11 carbon atoms. $X^{21}$ to $X^{25}$ separately represent any one of a hydrogen atom and a fluorine atom. Note that 0 or more and 2 or less of $X^{21}$ to $X^{25}$ each represent a fluorine atom.

Another embodiment of the present invention is an organic compound represented by General Formula (G12).

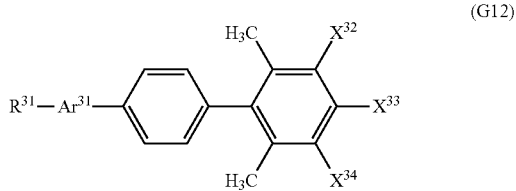

(G12)

In General Formula (G12), $Ar^{31}$ represents any one of a phenylene group, a cycloalkylene group, and a cycloalkenylene group, and $R^{31}$ represents any one of an alkyl group having 2 to 11 carbon atoms and an alkoxy group having 2 to 11 carbon atoms. $X^{32}$ to $X^{34}$ separately represent any one of a hydrogen atom and a fluorine atom. Note that 0 or more and 2 or less of $X^{32}$ to $X^{34}$ each represent a fluorine atom.

Another embodiment of the present invention is an organic compound represented by General Formula (G20).

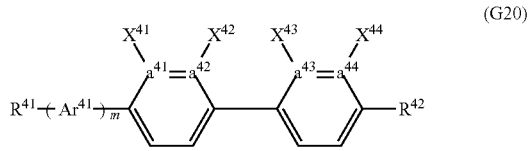

(G20)

In General Formula (G20), $Ar^{41}$ represents any one of a phenylene group, a cycloalkylene group, and a cycloalkenylene group, $R^{41}$ and $R^{42}$ separately represent any one of a hydrogen atom, an alkyl group having 1 to 11 carbon atoms, and an alkoxy group having 1 to 11 carbon atoms. In addition, m is 0 or 1. Furthermore, $a^1$-$X^{101}$, $a^2$-$X^{102}$, $a^3$-$X^{103}$, and $a^4$-$X^{104}$ separately represent any one of C—H, C—F, C—CH$_3$, and N.

Another embodiment of the present invention is a liquid crystal composition containing any of the organic compounds represented by General Formulae (G100), (G10), (G11), (G12), and (G20).

Other embodiments of the present invention are a liquid crystal element including the liquid crystal composition and a liquid crystal display device using the liquid crystal element.

One embodiment of the present invention makes it possible to provide a novel organic compound that can be used in a liquid crystal device.

One embodiment of the present invention makes it possible to provide a liquid crystal composition containing a novel organic compound, and a liquid crystal element and a liquid crystal display device each formed using the liquid crystal composition.

One embodiment of the present invention makes it possible to provide a liquid crystal composition which has high resistivity. One embodiment of the present invention makes it possible to provide a liquid crystal element which has a high voltage holding ratio.

One embodiment of the present invention makes it possible to provide a liquid crystal display device which consumes less power.

BRIEF DESCRIPTION OF DRAWINGS

FIGS. 2A to 2C illustrate one mode of a liquid crystal display device.

BEST MODE FOR CARRYING OUT THE INVENTION

Figure 1A:
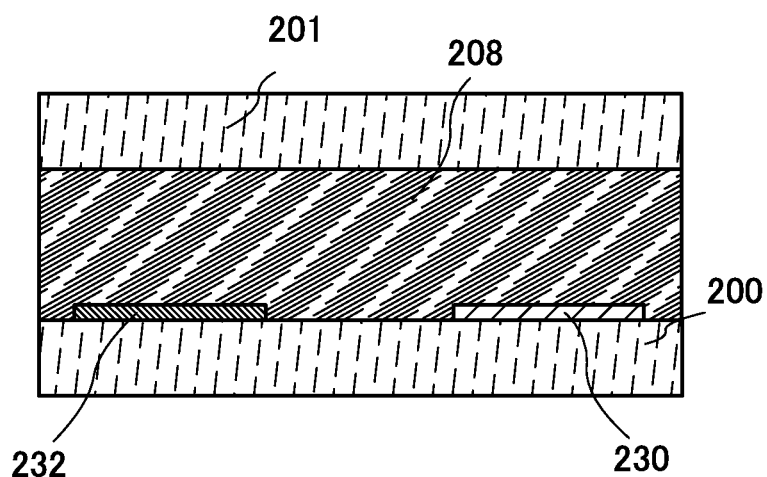
FIGS. 1A and 1B each illustrate one mode of a liquid crystal element and one mode of a liquid crystal display device.

Embodiments and examples of the invention disclosed in this specification will be described below with reference to the accompanying drawings. Note that the invention disclosed in this specification is not limited to the following description, and it is easily understood by those skilled in the art that modes and details of the invention can be modified in various ways. Therefore, the invention disclosed in this specification is not construed as being limited to the description of the following embodiments and examples. In the structures to be given below, the same portions or portions having similar functions are denoted by the same reference numerals in different drawings, and explanation thereof will not be repeated.

In addition, a liquid crystal display device in this specification and the like refers to an image display device or a light source (including a lighting device). A liquid crystal display device also refers to all the following modules: a module to which a connector, for example, a flexible printed circuit (FPC) or a tape carrier package (TCP) is attached, a module in which a printed wiring board is provided at the end of a TCP, and a module in which an integrated circuit (IC) is directly mounted on a display element by a chip on glass (COG) method. Note that a liquid crystal display device in this specification and the like refers to any type of electronic devices which utilizes liquid crystal characteristics; for example, a liquid crystal electro-optical device without display function is included in its category.

Note that ordinal numbers such as "first" and "second" in the following description are used for convenience and do not denote the order of steps or the stacking order of layers. Therefore, for example, description can be made even when "first" is replaced with "second", "third", or the like as appropriate. In addition, the ordinal numbers in this specification and the like are not necessarily the same as the ordinal numbers used to specify one embodiment of the present invention.

(Embodiment 1)

In this embodiment, a novel organic compound of one embodiment of the present invention will be described.

The novel organic compound of one embodiment of the present invention is represented by General Formula (G100).

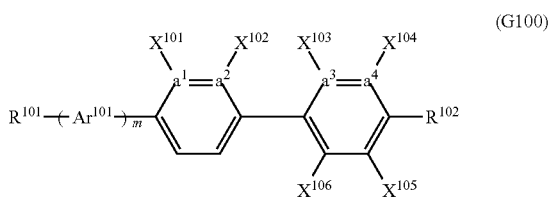

(G100)

In General Formula (G100), $Ar^{101}$ represents any one of a phenylene group, a cycloalkylene group, and a cycloalkenylene group. $R^{101}$ represents any one of a hydrogen atom, an alkyl group having 1 to 11 carbon atoms, and an alkoxy group having 1 to 11 carbon atoms. $R^{102}$ represents any one of a hydrogen atom, a fluorine atom, an alkyl group having 1 to 11 carbon atoms, and an alkoxy group having 1 to 11 carbon atoms. In addition, m is 0 or 1. Furthermore, $a^1$-$X^{101}$, $a^2$-$X^{102}$, $a^3$-$X^{103}$, and $a^4$-$X^{104}$ separately represent any one of C—H, C—F, C—CH$_3$, and N. $X^{105}$ and $X^{106}$ separately represent any one of a hydrogen atom, a fluorine atom, and a methyl group. Note that 0 or more and 3 or less of $X^{101}$ to $X^{106}$ each represent a fluorine atom.

The organic compound in this embodiment that is represented by General Formula (G100) can be used as a material for a liquid crystal composition.

The liquid crystal composition of one embodiment of the present invention includes a liquid crystalline compound, a non-liquid-crystalline compound, and/or a chiral material in addition to the organic compound represented by General Formula (G100).

The organic compound represented by General Formula (G100) has high resistivity. By including the organic compound represented by General Formula (G100), the liquid crystal composition of one embodiment of the present invention has high resistivity.

This embodiment can be implemented in combination with any of the structures of other embodiments as appropriate.

(Embodiment 2)

In this embodiment, novel organic compounds of embodiments of the present invention will be described.

A novel organic compound of one embodiment of the present invention is represented by General Formula (G10).

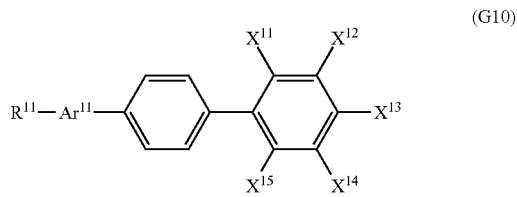

(G10)

In General Formula (G10), $Ar^{11}$ represents any one of a phenylene group, a cycloalkylene group, and a cycloalkenylene group, and $R^{11}$ represents any one of an alkyl group having 2 to 11 carbon atoms and an alkoxy group having 2 to 11 carbon atoms. $X^{11}$ and $X^{15}$ separately represent any one of a hydrogen atom, a fluorine atom, and a methyl group. $X^{12}$ to $X^{14}$ separately represent any one of a hydrogen atom and a fluorine atom. Note that when one of $X^{11}$ and $X^{15}$ represents a methyl group, the other of $X^{11}$ and $X^{15}$ also represents a methyl group, and 0 or more and 2 or less of $X^{11}$ to $X^{15}$ each represent a fluorine atom.

A novel organic compound of one embodiment of the present invention is represented by General Formula (G11).

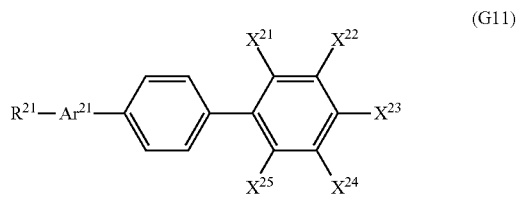

(G11)

In General Formula (G11), $Ar^{21}$ represents any one of a phenylene group, a cycloalkylene group, and a cycloalkenylene group, and $R^{21}$ represents any one of an alkyl group having 2 to 11 carbon atoms and an alkoxy group having 2 to 11 carbon atoms. $X^{21}$ to $X^{25}$ separately represent any one of a hydrogen atom and a fluorine atom. Note that 0 or more and 2 or less of $X^{21}$ to $X^{25}$ each represent a fluorine atom.

In the organic compound represented by General Formula (G11), when each of $X^{21}$ and $X^{25}$ represents a methyl group, a peak in an absorption spectrum can be on a shorter wavelength side than in the case where each of $X^{21}$ and $X^{25}$ represents a hydrogen atom. Such an organic compound can be highly resistant to ultraviolet light, thereby being stable. Accordingly, an organic compound represented by General Formula (G12) is preferable.

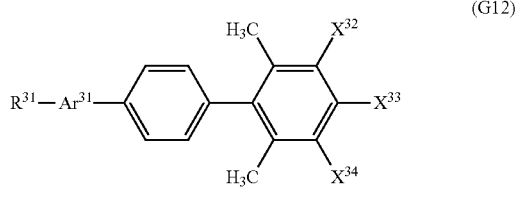

(G12)

In General Formula (G12), $Ar^{31}$ represents any one of a phenylene group, a cycloalkylene group, and a cycloalkenylene group, and $R^{31}$ represents any one of an alkyl group having 2 to 11 carbon atoms and an alkoxy group having 2 to 11 carbon atoms. $X^{32}$ to $X^{34}$ separately represent any one of a hydrogen atom and a fluorine atom. Note that 0 or more and 2 or less of $X^{32}$ to $X^{34}$ each represent a fluorine atom.

Specific examples of the organic compound represented by General Formula (G11) include the structures represented by Structural Formulae (100) to (111) and Structural Formulae (200) to (209). However, the present invention is not limited thereto.

(100)

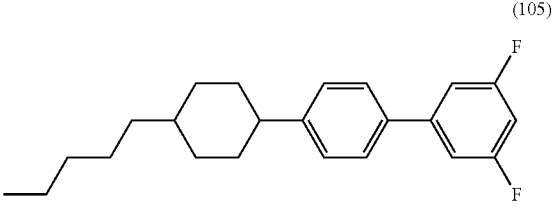

(101)

(102)

(103)

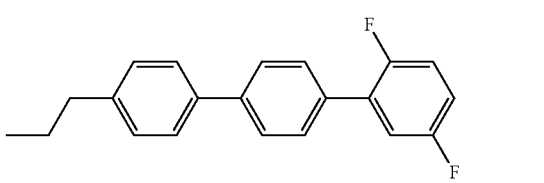

(104)

(105)

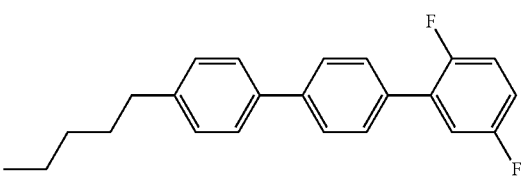

(106)

(107)

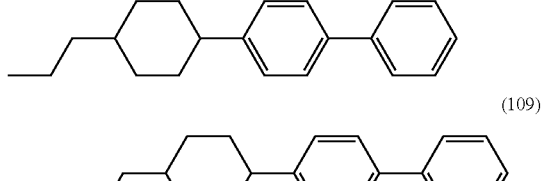

(108)

(109)

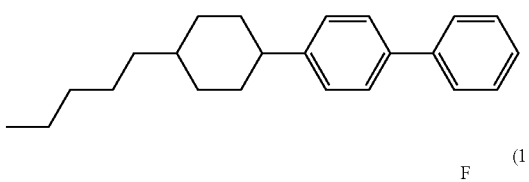

(110)

(111)

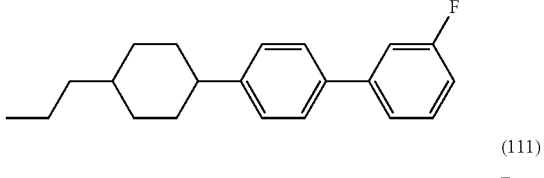

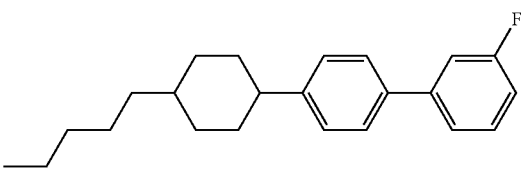

(112)

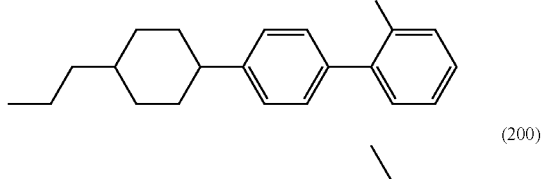

(200)

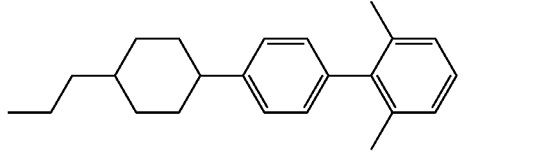

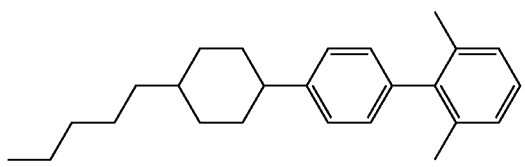

(201)

(202)

(203)

(204)

(205)

(206)

(207)

(208)

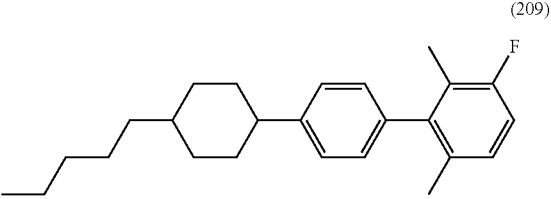

(209)

A synthesis method of the organic compound in this embodiment that is represented by General Formula (G10) can employ various types of reactions. For example, the organic compound represented by General Formula (G10) can be synthesized under Synthesis Scheme (A-1).

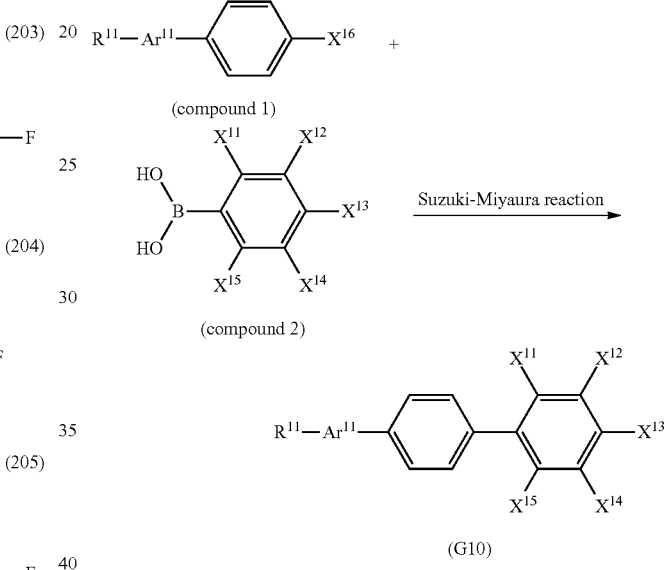

As shown in Synthesis Scheme (A-1), a halide of a phenyl derivative or a phenyl derivative that has a triflate group as a substituent (compound 1) is coupled with an organoboron compound or a boronic acid (compound 2) of a phenyl derivative by the Suzuki-Miyaura reaction, whereby the organic compound of one embodiment of the present invention represented by General Formula (G10) can by synthesized.

In Synthesis Scheme (A-1), $X^{16}$ represents any one of a halogen atom and a triflate group. $Ar^{11}$ represents any one of a phenylene group, a cycloalkylene group, and a cycloalkenylene group, and $R^{11}$ represents any one of an alkyl group having 2 to 11 carbon atoms and an alkoxy group having 2 to 11 carbon atoms. $X^{11}$ and $X^{15}$ separately represent any one of a hydrogen atom, a fluorine atom, and a methyl group. $X^{12}$ to $X^{14}$ separately represent any one of a hydrogen atom and a fluorine atom. Note that when one of $X^{11}$ and $X^{15}$ represents a methyl group, the other of $X^{11}$ and $X^{15}$ also represents a methyl group, and 0 or more and 2 or less of $X^{11}$ to $X^{15}$ each represent a fluorine atom.

The organic compound in this embodiment represented by General Formula (G10) and obtained in the above manner can be used as a material for a liquid crystal composition.

The liquid crystal composition of one embodiment of the present invention includes a liquid crystalline compound, a non-liquid-crystalline compound, and/or a chiral material in addition to the organic compound represented by General Formula (G10).

The organic compound represented by General Formula (G10) has high resistivity. By including the organic compound represented by General Formula (G10), the liquid crystal composition of one embodiment of the present invention has high resistivity.

This embodiment can be implemented in combination with any of the structures of other embodiments as appropriate.

(Embodiment 3)

In this embodiment, a novel organic compound of one embodiment of the present invention will be described.

A novel organic compound of one embodiment of the present invention is represented by General Formula (G20).

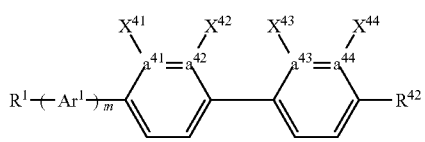

(G20)

In General Formula (G20), $Ar^{41}$ represents any one of a phenylene group, a cycloalkylene group, and a cycloalkenylene group, $R^{41}$ and $R^{42}$ separately represent any one of a hydrogen atom, an alkyl group having 1 to 11 carbon atoms, and an alkoxy group having 1 to 11 carbon atoms. In addition, m is 0 or 1. Furthermore, $a^1$-$X^{101}$, $a^2$-$X^{102}$, $a^3$-$X^{103}$, and $a^4$-$X^{104}$ separately represent any one of C—H, C—F, C—CH$_3$, and N.

Specific examples of the organic compound represented by General Formula (G20) include the structures represented by Structural Formulae (300) to (309). However, the present invention is not limited thereto.

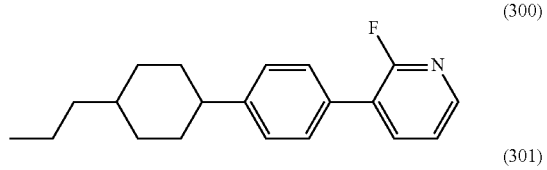
(300)

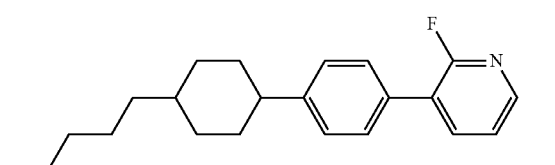
(301)

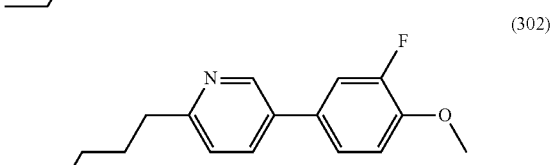
(302)

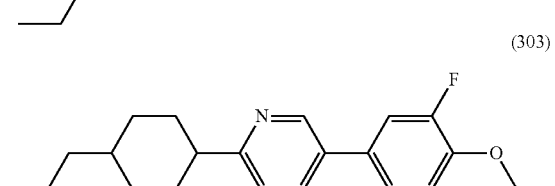
(303)

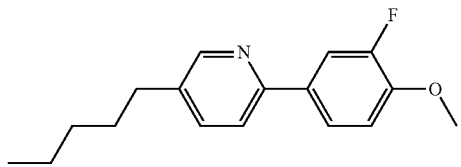
(304)

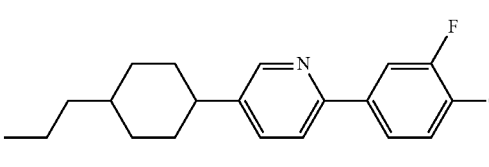
(305)

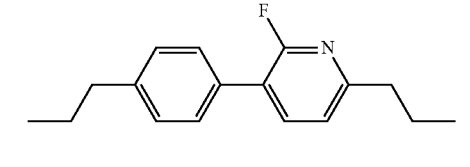
(306)

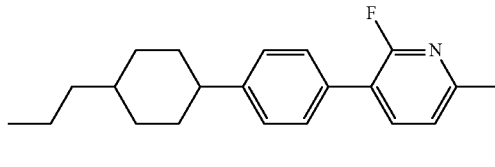
(307)

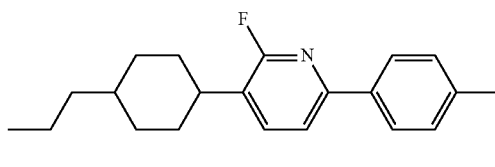
(308)

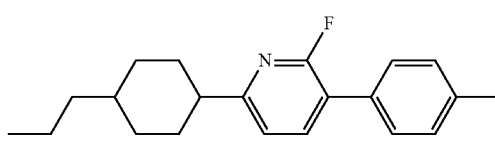
(309)

A synthesis method of the organic compound in this embodiment that is represented by General Formula (G20) can employ various types of reactions.

For example, an organic compound which is represented by General Formula (G20) and in which one of $a^{41}$-$X^{41}$ and $a^{42}$-$X^{42}$ represents a nitrogen atom, i.e., the organic compound represented by General Formula (G20-1), can be synthesized under Synthesis Scheme (B-1).

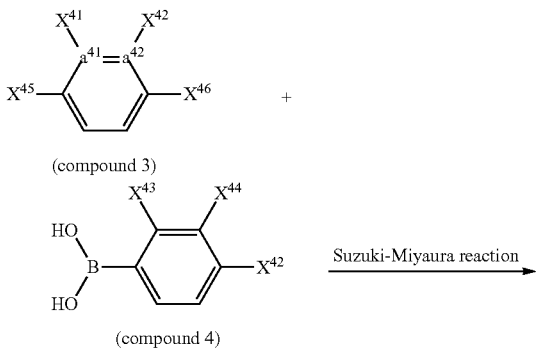
(B-1)

-continued

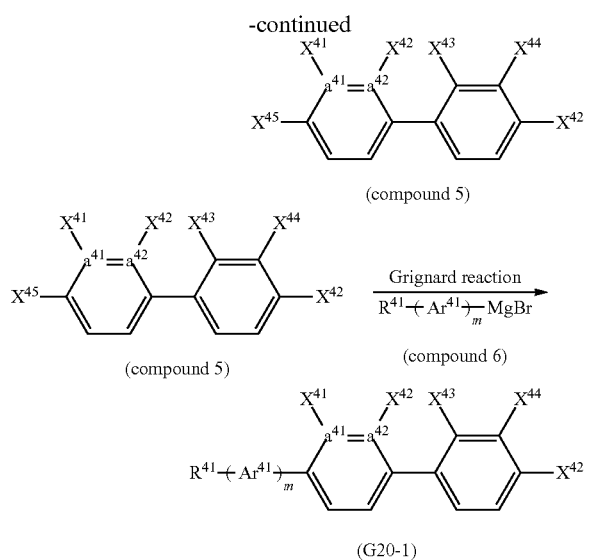

(compound 5)

(G20-1)

As shown in Synthesis Scheme (B-1), a halide of a pyridine derivative or a pyridine derivative having a triflate group as a substituent (compound 3) is coupled with an organoboron compound or a boronic acid (compound 4) of a phenyl derivative by the Suzuki-Miyaura reaction, whereby a phenylpyridine derivative (compound 5) is synthesized.

Then, the phenylpyridine derivative (compound 5) is reacted with a Grignard reagent obtained by using magnesium (compound 6) by the Grignard reaction, whereby the organic compound represented by General Formula (G20-1) can be synthesized.

In Synthesis Scheme (B-1), $X^{45}$ and $X^{46}$ separately represent any one of a halogen atom and a triflate group. The substituents represented by $X^{45}$ and $X^{46}$ are different from each other. $Ar^{41}$ represents any one of a phenylene group, a cycloalkylene group, and a cycloalkenylene group, $R^{41}$ and $R^{42}$ separately represent any one of a hydrogen atom, an alkyl group having 1 to 11 carbon atoms, and an alkoxy group having 1 to 11 carbon atoms. In addition, m is 0 or 1. Furthermore, $a^1$-$X^{101}$, $a^2$-$X^{102}$, $a^3$-$X^{103}$, and $a^4$-$X^{104}$ separately represent any one of C—H, C—F, C—CH$_3$, and N.

For example, an organic compound which is represented by General Formula (G20) and in which one of $a^{43}$-$X^{43}$ and $a^{44}$-$X^{44}$ represents a nitrogen atom, i.e., the organic compound represented by General Formula (G20-2), can be synthesized under Synthesis Scheme (B-2).

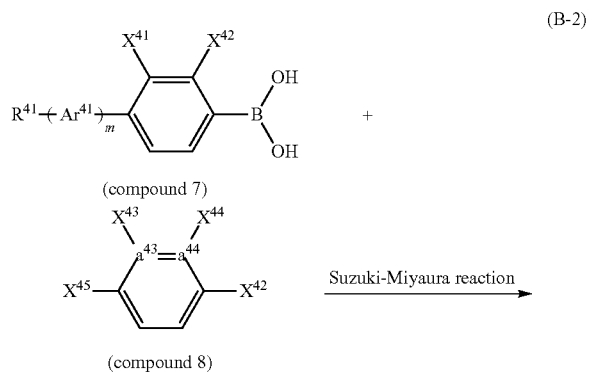

(B-2)

-continued

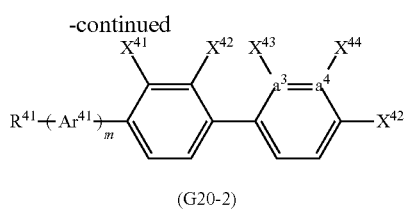

(G20-2)

As shown in Synthesis Scheme (B-2), an organoboron compound or a boronic acid (compound 7) of a phenyl derivative is coupled with a halide of a pyridine derivative or a pyridine derivative having a triflate group as a substituent (compound 8) by the Suzuki-Miyaura reaction, whereby the organic compound represented by General Formula (G20-2) can be synthesized.

In Synthesis Scheme (B-2), $X^{45}$ represents any one of a halogen atom and a triflate group. $Ar^{41}$ represents any one of a phenylene group, a cycloalkylene group, and a cycloalkenylene group, $R^{41}$ and $R^{42}$ separately represent any one of a hydrogen atom, an alkyl group having 1 to 11 carbon atoms, and an alkoxy group having 1 to 11 carbon atoms. In addition, m is 0 or 1. Furthermore, $a^1$-$X^{101}$, $a^2$, $X^{102}$, $a^3$-$X^{103}$, and $a^4$-$X^{104}$ separately represent any one of C—H, C—F, C—CH$_3$, and N.

Note that it is preferable that one of $a^{43}$-$X^{43}$ and $a^{44}$-$X^{44}$ represent a nitrogen atom in the organic compound represented by General Formula (G20) as shown in Synthesis Scheme (B-2) (the organic compound be represented by General Formula (G20-2)), in which case the number of synthesis steps can be reduced to facilitate the synthesis.

The organic compound in this embodiment represented by General Formula (G20) and obtained in the above manner can be used as a material for a liquid crystal composition.

The liquid crystal composition of one embodiment of the present invention includes a liquid crystalline compound, a non-liquid-crystalline compound, and/or a chiral material in addition to the organic compound represented by General Formula (G20).

The organic compound represented by General Formula (G20) has high resistivity. By including the organic compound represented by General Formula (G20), the liquid crystal composition of one embodiment of the present invention has high resistivity.

This embodiment can be implemented in combination with any of the structures of other embodiments as appropriate.

(Embodiment 4)

In this embodiment, a liquid crystal element and a liquid crystal display device each using any of the organic compounds represented by General Formulae (G100), (G10), (G11), (G12), and (G20) in Embodiments 1 to 3 or a liquid crystal composition containing any of the organic compounds will be described with reference to drawings.

Figure 1B:
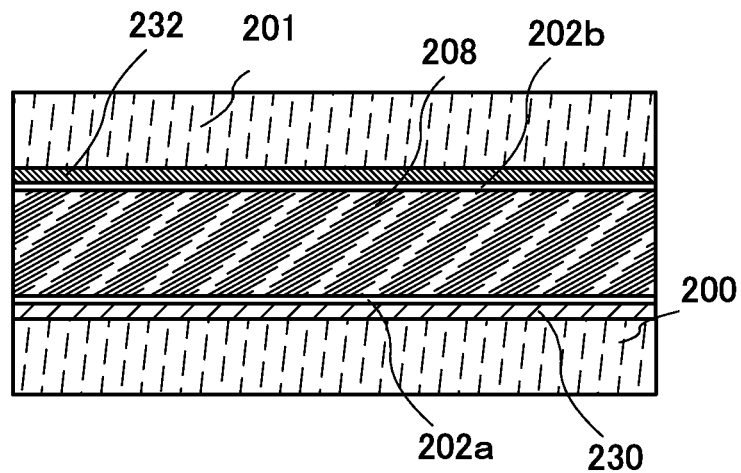

FIGS. 1A and 1B each illustrate examples of a liquid crystal element and a liquid crystal display device which are embodiments of the present invention.

Note that in this specification and the like, a liquid crystal element is an element which controls transmission of light by an optical modulation action of liquid crystal and includes at least a pair of electrodes and a liquid crystal layer interposed therebetween. The liquid crystal layer includes a liquid crystal composition.

FIGS. 1A and 1B each illustrate a liquid crystal display device in which a first substrate 200 and a second substrate 201 are positioned to face each other with a liquid crystal composition 208 interposed therebetween.

The liquid crystal element in this embodiment includes at least a pair of electrodes (a pixel electrode layer 230 and a common electrode layer 232 having different potentials), and the liquid crystal composition 208 containing any of the organic compounds represented by General Formulae (G100), (G10), (G11), (G12), and (G20) in Embodiments 1 to 3 between the pair of electrodes.

Differences between the liquid crystal element and the liquid crystal display device in FIG. 1A and those in FIG. 1B are positions of the pixel electrode layer 230 and the common electrode layer 232 with respect to the liquid crystal composition 208.

In FIG. 1A, the pixel electrode layer 230 and the common electrode layer 232 are provided between the first substrate 200 and the liquid crystal composition 208 so as to be adjacent to each other. With the structure in FIG. 1A, a method in which the gray scale is controlled by generating an electric field substantially parallel to a substrate to move liquid crystal molecules in a plane parallel to the substrate can be used.

In FIG. 1B, the pixel electrode layer 230 and the common electrode layer 232 are provided on the first substrate 200 side and the second substrate 201 side respectively, with the liquid crystal composition 208 interposed therebetween. With the structure in FIG. 1B, a method in which the gray scale is controlled by generating an electric field substantially perpendicular to a substrate to move liquid crystal molecules in a plane perpendicular to the substrate can be used.

An alignment film 202a may be provided between the liquid crystal composition 208 and the pixel electrode layer 230, and an alignment film 202b may be provided between the liquid crystal composition 208 and the common electrode layer 232. A liquid crystal composition of one embodiment of the present invention can be used for liquid crystal elements with a variety of structures and liquid crystal display devices with a variety of display modes.

The maximum thickness (film thickness) of the liquid crystal composition 208 is preferably greater than or equal to 1 μm and less than or equal to 20 μm.

The liquid crystal composition 208 can be formed by a dispenser method (a dropping method) or an injection method by which liquid crystal is injected using capillary action or the like after the first substrate 200 and the second substrate 201 are attached to each other.

Although not illustrated in FIGS. 1A and 1B, an optical film such as a polarizing plate, a retardation plate, or an anti-reflection film, or the like is provided as appropriate. For example, circular polarization by the polarizing plate and the retardation plate may be used. In addition, a backlight or the like can be used as a light source.

In this specification, a substrate provided with a semiconductor element (e.g., a transistor), a pixel electrode layer, and a common electrode layer is referred to as an element substrate (a first substrate), and a substrate which faces the element substrate with a liquid crystal composition interposed therebetween is referred to as a counter substrate (a second substrate).

As the liquid crystal display device of one embodiment of the present invention, a transmissive liquid crystal display device in which display is performed by transmission of light from a light source, a reflective liquid crystal display device in which display is performed by reflection of incident light, or a transflective liquid crystal display device in which a transmissive type and a reflective type are combined can be provided.

In the case of the transmissive liquid crystal display device, a pixel electrode layer, a common electrode layer, a first substrate, a second substrate, and other components such as an insulating film and a conductive film, which are provided in a pixel region through which light is transmitted, have a property of transmitting light in the visible wavelength range. In the liquid crystal display device having the structure illustrated in FIG. 1A, it is preferable that the pixel electrode layer and the common electrode layer have a light-transmitting property; however, if an opening pattern is provided, a non-light-transmitting material such as a metal film may be used depending on the shape.

In the case of the reflective liquid crystal display device, a reflective component which reflects light transmitted through a liquid crystal composition (e.g., a reflective film or substrate) may be provided on the side opposite to the viewing side of the liquid crystal composition. A light-transmitting material may be used for a substrate, an insulating film, and a conductive film which are provided between the viewing side of the liquid crystal composition and the reflective component. Note that in this specification, a light-transmitting property refers to a property of transmitting at least light in the visible wavelength range. In the liquid crystal display device having the structure illustrated in FIG. 1B, the pixel electrode layer or the common electrode layer on the side opposite to the viewing side may have a light-reflecting property so that it can be used as a reflective component.

The pixel electrode layer 230 and the common electrode layer 232 can be formed with the use of one or more of the following: indium tin oxide (ITO), indium zinc oxide (IZO) obtained by mixing zinc oxide (ZnO) into indium oxide, a conductive material in which silicon oxide ($SiO_2$) is mixed into indium oxide, indium oxide containing tungsten oxide, indium zinc oxide containing tungsten oxide, indium oxide containing titanium oxide, and indium tin oxide containing titanium oxide; graphene; metals such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); alloys thereof; and metal nitrides thereof.

As the first substrate 200 and the second substrate 201, a glass substrate made of barium borosilicate glass, aluminoborosilicate glass, or the like, a quartz substrate, a plastic substrate, or the like can be used.

A liquid crystal composition containing any of the organic compounds represented by General Formulae (G100), (G10), (G11), (G12), and (G20), which are embodiments of the present invention, has high resistivity. The use of the liquid crystal composition with high resistivity enables the liquid crystal element to have a high voltage holding ratio.

Furthermore, in a liquid crystal display device including an element with a high voltage holding ratio as a liquid crystal element, leakage of electrical charges through the liquid crystal element can be inhibited, which results in low power consumption or high contrast.

The structures, the methods, and the like described in this embodiment can be combined as appropriate with any of the structures, the methods, and the like described in the other embodiments.

(Embodiment 5)

As a liquid crystal display device of one embodiment of the present invention, a passive matrix liquid crystal display device and an active matrix liquid crystal display device can be provided. In this embodiment, an example of an active matrix liquid crystal display device of one embodiment of the present invention will be described with reference to FIGS. 2A to 2C.

FIG. 2A is a plan view of the liquid crystal display device in this embodiment. FIG. 2B is a plan view of one pixel included in a display portion. FIG. 2C corresponds to a cross-sectional view taken along the line M-N in FIG. 2A.

In FIG. 2A, a sealant 405 is provided so as to surround a pixel portion 402 and a scan line driver circuit 404 which are provided over a substrate 401. A substrate 406 is provided over the pixel portion 402 and the scan line driver circuit 404. Consequently, the pixel portion 402 and the scan line driver circuit 404 are sealed together with a liquid crystal element by the substrate 401, the sealant 405, and the substrate 406.

In FIG. 2A, an IC chip is mounted on a region of the substrate 401, which is different from the region surrounded by the sealant 405; alternatively, a signal line driver circuit 403 formed using a single crystal semiconductor film or a polycrystalline semiconductor film is formed over a substrate separately prepared. Various signals and potentials applied to the pixel portion 402 through the signal line driver circuit 403 and the scan line driver circuit 404 are supplied from a flexible printed circuit (FPC) 418.

Although FIG. 2A illustrates an example in which the signal line driver circuit 403 is formed separately and mounted on the substrate 401, one embodiment of the present invention is not limited to this structure. The scan line driver circuit may be separately formed and then mounted, or only part of the signal line driver circuit or part of the scan line driver circuit may be separately formed and then mounted.

Note that there is no particular limitation on a method for connecting a separately formed driver circuit, and a chip on glass (COG) method, a wire bonding method, a tape automated bonding (TAB) method, or the like can be used. FIG. 2A illustrates an example in which the signal line driver circuit 403 is mounted by the COG method.

Further, a liquid crystal display device includes a panel in which a liquid crystal element is sealed, and a module in which an IC or the like including a controller is mounted to the panel. In other words, the display device in this specification means an image display device or a light source (including a lighting device). Furthermore, the display device also includes the following modules in its category: a module to which a connector such as an FPC or a tape carrier package (TCP) is attached; a module having a TCP at the tip of which a printed wiring board is provided; and a module in which an integrated circuit (IC) is directly mounted on a display element by a COG method.

The pixel portion and the scan line driver circuit provided over the substrate include a plurality of transistors. As the transistors, a transistor in which a channel is formed in an oxide semiconductor is preferably used.

An oxide semiconductor has a wide energy gap of 3.0 eV or more. A transistor using an oxide semiconductor film obtained by processing an oxide semiconductor in an appropriate condition while sufficiently reducing the carrier density can have much lower leakage current between a source and a drain in an off state (off-state current) than a conventional transistor using silicon.

In this embodiment, the off-state current of transistors 410 and 411 used in the liquid crystal display device, in particular, the off-state current of the transistor 410 used in the pixel portion is preferably as low as possible, and specifically, the off-state current per micrometer of channel length is preferably lower than or equal to 100 zA. Since the off-state current is preferably as low as possible, the normalized off-state current is preferably lower than or equal to 10 zA/μm, more preferably lower than or equal to 1 zA/μm, still more preferably lower than or equal to 10 yA/μm.

By reducing impurities serving as electron donors, such as moisture or hydrogen, and also reducing oxygen vacancies, an i-type (intrinsic) or a substantially i-type oxide semiconductor can be obtained. Here, such an oxide semiconductor is referred to as a highly purified oxide semiconductor. When a highly purified oxide semiconductor is used for a channel, the normalized off-state current can be reduced to about several yoctoamperes per micrometer (yA/μm) to several zeptoamperes per micrometer (zA/μm).

An oxide semiconductor that can be used preferably contains at least indium (In) or zinc (Zn). In particular, In and Zn are preferably contained. In addition, as a stabilizer for reducing variations in electrical characteristics of transistors each using the oxide semiconductor, one or more elements selected from gallium (Ga), tin (Sn), hafnium (Hf), zirconium (Zr), titanium (Ti), scandium (Sc), yttrium (Y), and a lanthanoid (such as cerium (Ce), neodymium (Nd), or gadolinium (Gd)) are preferably contained. The transistor using the oxide semiconductor will be described in detail in Embodiment 4.

The transistors 410 and 411 are bottom-gate transistors in FIG. 2C; however, the transistors 410 and 411 in this embodiment are not limited thereto, and may be top-gate transistors. Alternatively, the transistors 410 and 411 may be dual-gate transistors each including two gate electrodes with a channel sandwiched therebetween. When the transistors 410 and 411 each including an oxide semiconductor are the dual-gate transistors, current drive characteristics can be improved and/or a change in the threshold voltage can be suppressed.

The liquid crystal display device of one embodiment of the present invention can employ a vertical electric field mode or a horizontal electric field mode. FIG. 2C illustrates an example in which a fringe field switching (FFS) mode is employed.

As illustrated in FIGS. 2A and 2C, the liquid crystal display device includes a connection terminal electrode 415 and a terminal electrode 416. The connection terminal electrode 415 and the terminal electrode 416 are electrically connected to a terminal included in the FPC 418 through an anisotropic conductive layer 419.

The connection terminal electrode 415 is formed from the same conductive layer as a first electrode layer 434. The terminal electrode 416 is formed from the same conductive layer as gate electrode layers of the transistors 410 and 411.

Insulating layers 432a and 432b are provided over the transistors 410 and 411.

In FIG. 2C, a planarization insulating layer 440 is provided over the insulating layer 432b, and an insulating layer 442 is provided between the first electrode layer 434 and a second electrode layer 431.

A gate insulating layer included in each of the transistors 410 and 411 can have a single layer structure or a stacked-layer structure. In this embodiment, the gate insulating layer may have a stacked-layer structure including gate insulating layers 420a and 420b. In FIG. 2C, the gate insulating layer 420a and the insulating layer 432b extend below the sealant 405 to cover an end portion of the terminal electrode 416, and the insulating layer 432b covers side surfaces of the gate insulating layer 420b and the insulating layer 432a.

The planarization insulating layer 440 can be formed using an organic resin such as an acrylic resin, a polyimide resin, a benzocyclobutene-based resin, a polyamide resin, or an epoxy resin. Other than such organic materials, a low-dielectric constant material (a low-k material), a siloxane-based resin, or the like can be used.

In FIG. 2C, a liquid crystal element 413 includes the first electrode layer 434, the second electrode layer 431, and a liquid crystal layer 408. The liquid crystal layer 408 is formed using a liquid crystal composition containing any of the organic compounds represented by General Formulae (G100), (G10), (G11), (G12), and (G20) in Embodiments 1 to 3. Insulating layers 438 and 433 serving as alignment films are provided so that the liquid crystal layer 408 is interposed therebetween.

In the liquid crystal element 413, the second electrode layer 431 having an opening pattern is provided below the liquid crystal layer 408, and the first electrode layer 434 having a flat plate shape is provided below the second electrode layer 431 with the insulating layer 442 provided therebetween. The second electrode layer 431 having the opening pattern has a shape including a bend portion or a branching comb-like shape. Since the second electrode layer 431 has the opening pattern, an electric field can be generated between the first electrode layer 434 and the second electrode layer 431. Note that a structure may be employed in which the second electrode layer 431 having a flat plate shape is formed on and in contact with the planarization insulating layer 440, and the first electrode layer 434 having an opening pattern and serving as a pixel electrode is formed over the second electrode layer 431 with the insulating layer 442 provided therebetween.

The first electrode layer 434 and the second electrode layer 431 can be formed using a light-transmitting conductive material such as indium oxide containing tungsten oxide, indium zinc oxide containing tungsten oxide, indium oxide containing titanium oxide, indium tin oxide containing titanium oxide, indium tin oxide, indium zinc oxide, indium tin oxide to which silicon oxide is added, or graphene.

Alternatively, the first electrode layer 434 and the second electrode layer 431 can be formed using one or more materials selected from metals such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); an alloy of any of these metals; and a nitride of any of these metals.

A conductive composition containing a conductive high molecule (also referred to as conductive polymer) can be used for the first electrode layer 434 and the second electrode layer 431.

A columnar spacer 435 is obtained by selective etching of an insulating layer and is provided to control the thickness (cell gap) of the liquid crystal layer 408. Alternatively, a spherical spacer may be used.

The size of a storage capacitor provided in the liquid crystal display device is set in consideration of the leakage current of the transistor provided in the pixel portion or the like so that electrical charges can be held for a predetermined period. The size of the storage capacitor may be set in consideration of the off-state current of the transistor or the like. In the liquid crystal display device described in this embodiment, leakage of electrical charges through the liquid crystal element can be inhibited because the liquid crystal element has a high voltage holding ratio; thus, the size of the storage capacitor can be small. In addition, the use of the transistor including an oxide semiconductor as a transistor can also contributes to a reduction of the size of the storage capacitor. Accordingly, the aperture ratio of each pixel can be improved, resulting in an increase in resolution.

In particular, it is preferable that a capacitor as a storage capacitor be not provided and that parasitic capacitance generated between the first electrode layer 434 and the second electrode layer 431 be used as a storage capacitor. Without the capacitor, the aperture ratio of the pixel can be further increased.

FIG. 2B illustrates an example of a pixel structure in which the capacitor as a storage capacitor is not provided for a pixel. The pixel includes an intersection portion of a wiring 450 electrically connected to the gate electrode layer of the transistor 410 and a wiring 452 electrically connected to one of a source electrode layer and a drain electrode layer of the transistor 410. Since the pixel in FIG. 2B does not include the capacitor as a storage capacitor, the ratio of the area of the second electrode layer 431 having the opening pattern to the area occupied by the pixel can be made extremely large, and an extremely high aperture ratio can be obtained.

As described above, in the transistor using an oxide semiconductor, the current in an off state (off-state current) can be made low. Accordingly, an electric signal such as an image signal can be held for a longer period and a writing interval can be set longer.

With the use of a transistor with low off-state current, the liquid crystal display device in this embodiment can display images by at least two driving methods (modes). The first driving mode is a conventional driving method of a liquid crystal display device, in which data is rewritten sequentially every frame. The second driving mode is a driving method in which data rewriting is stopped after data writing is executed, i.e., a driving mode with a reduced refresh rate.

Moving images are displayed in the first driving mode. A still image can be displayed without change in image data every frame; thus, it is not necessary to rewrite data every frame. When the liquid crystal display device is driven in the second driving mode in displaying still images, power consumption can be reduced with less screen flicker.

In addition, since the liquid crystal element used in the liquid crystal display device of this embodiment has a high voltage holding ratio, leakage of electrical charges through the liquid crystal element can be inhibited. For this reason, a change in voltage applied to the liquid crystal layer can be inhibited for a long time even when the liquid crystal display device is used in the driving mode with a reduced refresh rate. This makes it possible to prevent screen flickers from being perceived by a user more effectively. Thus, the power consumption can be reduced and the display quality can be improved.

Note that in the liquid crystal display device of one embodiment of the present invention, a black matrix (light-blocking layer); an optical member (an optical substrate) such as a polarizing member, a retardation member, or an anti-reflection member; and the like are provided as appropriate. For example, circular polarization may be employed using a polarizing plate or a retardation plate. In addition, a backlight, a sidelight, or the like may be used as a light source.

As a display method in the pixel portion, a progressive method, an interlace method, or the like can be employed. Color elements controlled in each pixel for color display are not limited to three colors: R, G, and B (which correspond to red, green, and blue, respectively). For example, R, G, B, and W (W corresponds to white); or R, G, B, and one or more of yellow, cyan, magenta, and the like can be used. Furthermore, the sizes of display regions may be different between respective dots of color elements. Note that the disclosed invention is not limited to the application to a display device for color display and the disclosed invention can also be applied to a display device for monochrome display.

In addition, the liquid crystal display device may be provided with a touch sensor. An electronic device or the like using a liquid crystal display device in which a touch sensor is provided to overlap with the pixel portion 402 can be operated more intuitively.

The structures, the methods, and the like described in this embodiment can be combined as appropriate with any of the structures, the methods, and the like described in the other embodiments.

(Embodiment 6)

In this embodiment, a transistor that includes an oxide semiconductor and that can be used for the liquid crystal display device of one embodiment of the present invention will be described.

As the oxide semiconductor used to form a channel of the transistor, any of the following can be used, for example: indium oxide, tin oxide, zinc oxide, In—Zn-based oxide, Sn—Zn-based oxide, Al—Zn-based oxide, Zn—Mg-based oxide, Sn—Mg-based oxide, In—Mg-based oxide, In—Ga-based oxide, In—Ga—Zn-based oxide, In—Al—Zn-based oxide, In—Sn—Zn-based oxide, Sn—Ga—Zn-based oxide, Al—Ga—Zn-based oxide, Sn—Al—Zn-based oxide, In—Hf—Zn-based oxide, In—Zr—Zn-based oxide, In—Ti—Zn-based oxide, In—Sc—Zn-based oxide, In—Y—Zn-based oxide, In—La—Zn-based oxide, In—Ce—Zn-based oxide, In—Pr—Zn-based oxide, In—Nd—Zn-based oxide, In—Sm—Zn-based oxide, In—Eu—Zn-based oxide, In—Gd—Zn-based oxide, In—Tb—Zn-based oxide, In—Dy—Zn-based oxide, In—Ho—Zn-based oxide, In—Er—Zn-based oxide, In—Tm—Zn-based oxide, In—Yb—Zn-based oxide, In—Lu—Zn-based oxide, In—Sn—Ga—Zn-based oxide, In—Hf—Ga—Zn-based oxide, In—Al—Ga—Zn-based oxide, In—Sn—Al—Zn-based oxide, In—Sn—Hf—Zn-based oxide, and In—Hf—Al—Zn-based oxide.

Here, an In—Ga—Zn-based oxide refers to an oxide containing In, Ga, and Zn as its main components and there is no particular limitation on the ratio of In to Ga and Zn. The In—Ga—Zn-based oxide may contain a metal element other than In, Ga, and Zn.

Alternatively, a material represented by 1 $nMO_3(ZnO)_m$ (where m is larger than 0) may be used as the oxide semiconductor. Note that M represents one or more metal elements selected from Ga, Fe, Mn, and Co, or any of the above-described elements as a stabilizer. Alternatively, as the oxide semiconductor, a material represented by $In_2SnO_5(ZnO)_n$ (where n is larger than 0) may be used.

For example, it is possible to use an In—Ga—Zn-based oxide with an atomic ratio of In:Ga:Zn=1:1:1, In:Ga:Zn=1:3:2, In:Ga:Zn=3:1:2, or In:Ga:Zn=2:1:3, or an oxide whose atomic ratio is in the neighborhood of the above compositions.

If the oxide semiconductor film contains a large amount of hydrogen, the hydrogen and the oxide semiconductor are bonded to each other, so that part of the hydrogen serves as a donor and causes generation of an electron which is a carrier. As a result, the threshold voltage of the transistor including the oxide semiconductor shifts in the negative direction. Therefore, after formation of the oxide semiconductor film, dehydration treatment (dehydrogenation treatment) is preferably performed to remove hydrogen or moisture from the oxide semiconductor film so that the oxide semiconductor film is highly purified to contain impurities as little as possible.

Note that oxygen in the oxide semiconductor film is also reduced by the dehydration treatment (dehydrogenation treatment) in some cases. Accordingly, it is preferable that oxygen be added to the oxide semiconductor film to fill oxygen vacancies increased by the dehydration treatment (dehydrogenation treatment). Here, treatment for supplying oxygen to the oxide semiconductor film may be expressed as oxygen adding treatment, and treatment for making the oxygen content of the oxide semiconductor film be in excess of that in the stoichiometric composition may be expressed as treatment for making an oxygen-excess state.

In this manner, hydrogen or moisture is removed from the oxide semiconductor film by the dehydration treatment (dehydrogenation treatment) and oxygen vacancies therein are filled by the oxygen adding treatment, so that the oxide semiconductor film can be an i-type (intrinsic) oxide semiconductor film or a substantially i-type (intrinsic) high-purity oxide semiconductor film which is extremely close to an i-type oxide semiconductor film. Note that "substantially intrinsic" means that the oxide semiconductor film includes extremely few (close to zero) carriers derived from a donor and has a carrier density of $1\times10^{17}/cm^3$ or lower, $1\times10^{16}/cm^3$ or lower, $1\times10^{15}/cm^3$ or lower, $1\times10^{14}/cm^3$ or lower, or $1\times10^{13}/cm^3$ or lower.

A structure of the oxide semiconductor film is described below.

An oxide semiconductor film is classified roughly into a single-crystal oxide semiconductor film and a non-single-crystal oxide semiconductor film. The non-single-crystal oxide semiconductor film includes any of an amorphous oxide semiconductor film, a microcrystalline oxide semiconductor film, a polycrystalline oxide semiconductor film, a c-axis aligned crystalline oxide semiconductor (CAAC-OS) film, and the like.

The amorphous oxide semiconductor film has disordered atomic arrangement and no crystalline component. A typical example thereof is an oxide semiconductor film in which no crystal part exists even in a microscopic region, and the whole of the film is amorphous.

The microcrystalline oxide semiconductor film includes a microcrystal (also referred to as nanocrystal) with a size greater than or equal to 1 nm and less than 10 nm, for example. Thus, the microcrystalline oxide semiconductor film has a higher degree of atomic order than the amorphous oxide semiconductor film. Hence, the density of defect states of the microcrystalline oxide semiconductor film is lower than that of the amorphous oxide semiconductor film.

The CAAC-OS film is one of oxide semiconductor films including a plurality of crystal parts, and most of the crystal parts each fit inside a cube whose one side is less than 100 nm. Thus, there is a case where a crystal part included in the CAAC-OS film fits inside a cube whose one side is less than 10 nm, less than 5 nm, or less than 3 nm. The density of defect states of the CAAC-OS film is lower than that of the microcrystalline oxide semiconductor film. The CAAC-OS film is described in detail below.

In a transmission electron microscope (TEM) image of the CAAC-OS film, a boundary between crystal parts, that is, a grain boundary is not clearly observed. Thus, in the CAAC-OS film, a reduction in electron mobility due to the grain boundary is less likely to occur.

According to the TEM image of the CAAC-OS film observed in a direction substantially parallel to a sample surface (cross-sectional TEM image), metal atoms are arranged in a layered manner in the crystal parts. Each metal atom layer has a morphology reflected by a surface over which the CAAC-OS film is formed (hereinafter, a surface over which the CAAC-OS film is formed is referred to as a formation surface) or a top surface of the CAAC-OS film, and is arranged in parallel to the formation surface or the top surface of the CAAC-OS film.

On the other hand, according to the TEM image of the CAAC-OS film observed in a direction substantially perpendicular to the sample surface (plan TEM image), metal atoms are arranged in a triangular or hexagonal configuration in the crystal parts. However, there is no regularity of arrangement of metal atoms between different crystal parts.

From the results of the cross-sectional TEM image and the plan TEM image, alignment is found in the crystal parts in the CAAC-OS film.

A CAAC-OS film is subjected to structural analysis with an X-ray diffraction (XRD) apparatus. For example, when the CAAC-OS film including an $InGaZnO_4$ crystal is analyzed by an out-of-plane method, a peak appears frequently when the diffraction angle (2θ) is around 31°. This peak is derived from the (009) plane of the $InGaZnO_4$ crystal, which indicates that crystals in the CAAC-OS film have c-axis alignment, and that the c-axes are aligned in a direction substantially perpendicular to the formation surface or the top surface of the CAAC-OS film.

On the other hand, when the CAAC-OS film is analyzed by an in-plane method in which an X-ray enters a sample in a direction substantially perpendicular to the c-axis, a peak appears frequently when 2θ is around 56°. This peak is derived from the (110) plane of the $InGaZnO_4$ crystal. Here, analysis (φ scan) is performed under conditions where the sample is rotated around a normal vector of a sample surface as an axis (φ axis) with 2θ fixed at around 56°. In the case where the sample is a single-crystal oxide semiconductor film of $InGaZnO_4$, six peaks appear. The six peaks are derived from crystal planes equivalent to the (110) plane. On the other hand, in the case of a CAAC-OS film, a peak is not clearly observed even when φ scan is performed with 2θ fixed at around 56°.

According to the above results, in the CAAC-OS film, while the directions of a-axes and b-axes are different between crystal parts, the c-axes are aligned in a direction parallel to a normal vector of a formation surface or a normal vector of a top surface. Thus, each metal atom layer arranged in a layered manner observed in the cross-sectional TEM image corresponds to a plane parallel to the a-b plane of the crystal.

Note that the crystal part is formed concurrently with deposition of the CAAC-OS film or is formed through crystallization treatment such as heat treatment. As described above, the c-axis of the crystal is aligned in a direction parallel to a normal vector of a formation surface or a normal vector of a top surface of the CAAC-OS film. Thus, for example, in the case where a shape of the CAAC-OS film is changed by etching or the like, the c-axis might not be necessarily parallel to a normal vector of a formation surface or a normal vector of a top surface of the CAAC-OS film.

Further, the degree of crystallinity in the CAAC-OS film is not necessarily uniform. For example, in the case where crystal growth leading to the CAAC-OS film occurs from the vicinity of the top surface of the film, the degree of the crystallinity in the vicinity of the top surface is higher than that in the vicinity of the formation surface in some cases. Further, when an impurity is added to the CAAC-OS film, the crystallinity in a region to which the impurity is added is changed, and the degree of crystallinity in the CAAC-OS film varies depending on the region.

Note that when the CAAC-OS film with an $InGaZnO_4$ crystal is analyzed by an out-of-plane method, a peak of 2θ may also be observed at around 36°, in addition to the peak of 2θ at around 31°. The peak of 2θ at around 36° indicates that a crystal having no c-axis alignment is included in part of the CAAC-OS film. It is preferable that in the CAAC-OS film, a peak of 2θ appears at around 31° and a peak of 2θ do not appear at around 36°.

With the use of the CAAC-OS film in a transistor, variation in electrical characteristics of the transistor due to irradiation with visible light or ultraviolet light is small. Thus, the transistor has high reliability.

Note that an oxide semiconductor film may be a stacked film including two or more kinds of an amorphous oxide semiconductor film, a microcrystalline oxide semiconductor film, and a CAAC-OS film, for example.

In this specification, the term "parallel" indicates that the angle formed between two straight lines ranges from −10° to 10°, and accordingly also includes the case where the angle ranges from −5° to 5°. In addition, the term "perpendicular" indicates that the angle formed between two straight lines ranges from 80° to 100°, and accordingly includes the case where the angle ranges from 85° to 95°.

In this specification, the trigonal and rhombohedral crystal systems are included in the hexagonal crystal system.

The structures, the methods, and the like described in this embodiment can be combined as appropriate with any of the structures, the methods, and the like described in the other embodiments.

(Embodiment 7)

In this embodiment, the significance of a reduction in refresh rate described in the above embodiments is explained.

The eye strain is divided into two categories: nerve strain and muscle strain. The nerve strain is caused by prolonged looking at light emitted from a liquid crystal display device or blinking images. This is because the brightness stimulates and fatigues the retina and nerve of the eye and the brain. The muscle strain is caused by overuse of a ciliary muscle which works for adjusting the focus.

Figure 3A:
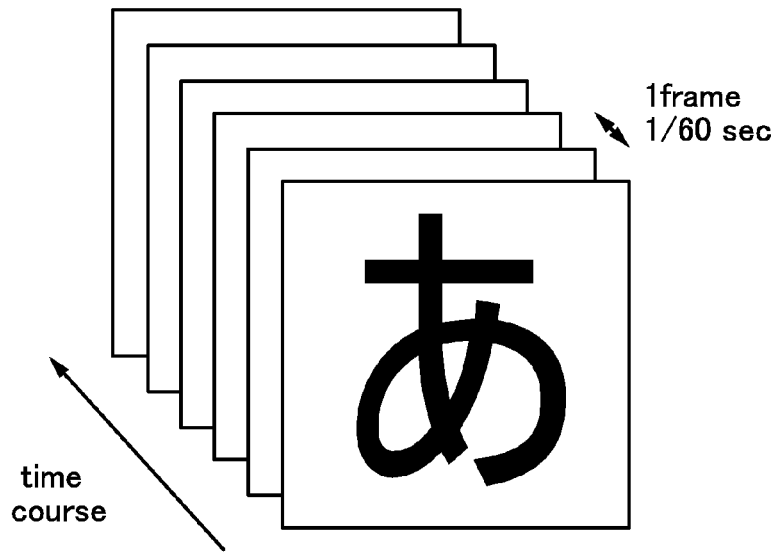
FIGS. 3A and 3B are schematic diagrams illustrating examples of a driving method of a liquid crystal display device.

FIG. 3A is a schematic diagram illustrating display of a conventional liquid crystal display device. As illustrated in FIG. 3A, for the display of the conventional liquid crystal display device, image rewriting is performed 60 times per second. A prolonged looking at such a screen might stimulate the retina and nerve of the eye and the brain of a user and lead to eye strain.

In one embodiment of the present invention, a transistor with an extremely low off-state current (e.g., a transistor using an oxide semiconductor) is used in a pixel portion of a liquid crystal display device. As a liquid crystal element, a liquid crystal element with a high voltage holding ratio is used. With these components, leakage of electrical charges applied to a liquid crystal layer can be inhibited, whereby the luminance of a liquid crystal display device can be kept even at a lower frame frequency.

Figure 3B:
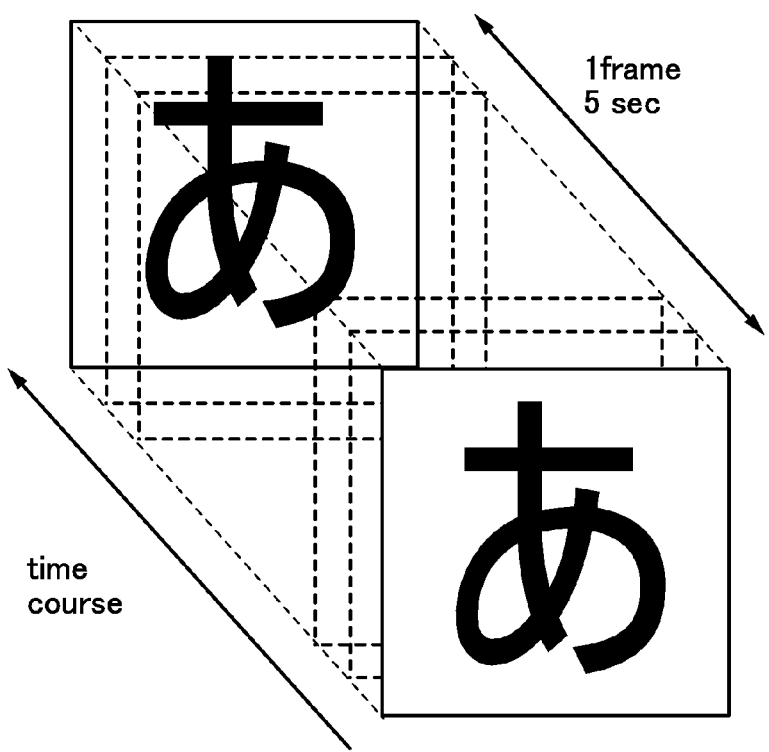

Thus, for example, the number of times of image writing can be reduced to once every five seconds as shown in FIG. 3B. The same image can be displayed for as long as possible and flickers on a screen perceived by a user can be reduced. This makes it possible to reduce stimuli to the retina and nerve of the eye and the brain of a user, resulting in less nerve strain.

Figure 4A:
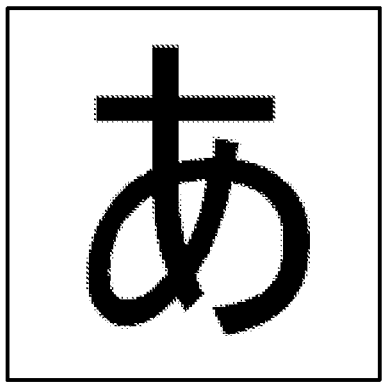
FIGS. 4A and 4B are schematic diagrams illustrating examples of a driving method of a liquid crystal display device.

In the case where the size of one pixel is large (e.g., the resolution is less than 150 ppi), a blurred character is displayed by a liquid crystal display device as shown in FIG. 4A. When a user look at the blurred character displayed on the liquid crystal display device for a long time, their ciliary muscles keep working to adjust the focus in a state where adjusting the focus is difficult, which might lead to eye strain.

Figure 4B:
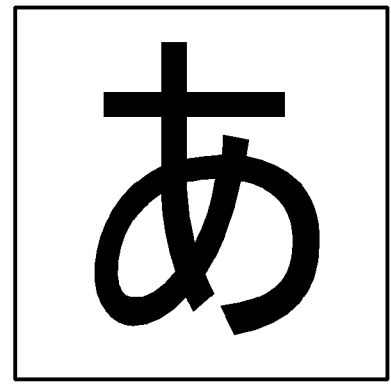

In contrast, in the liquid crystal display device of one embodiment of the present invention, the size of one pixel is small and thus high resolution display is performed as shown in FIG. 4B, so that precise and smooth display can be achieved. The precise and smooth display enables ciliary muscles to adjust the focus more easily, and reduces muscle strain of a user.

Quantitative measurement of eye strain has been studied. For example, the critical flicker (fusion) frequency (CFF) is known as an index of measuring nerve strain; and the accommodation time and the accommodation near point are known as indexes of measuring muscle strain.

Examples of other methods for measuring eye strain include electroencephalography, thermography, measurement of the number of blinkings, measurement of tear volume, measurement of a pupil contractile response speed, and a questionnaire for surveying subjective symptoms.

One embodiment of the present invention can provide an eye-friendly liquid crystal display device.

(Embodiment 8)

A liquid crystal display device disclosed in this specification can be applied to a variety of electronic devices (including game machines). Examples of electronic devices are a television set (also referred to as a television or a television receiver), a monitor of a computer or the like, a camera such as a digital camera or a digital video camera, a digital photo frame, a mobile phone handset (also referred to as a mobile phone or a mobile phone device), a portable game machine, a personal digital assistant, an audio reproducing device, a large-sized game machine such as a pachinko machine, and the like.

Figure 5A:
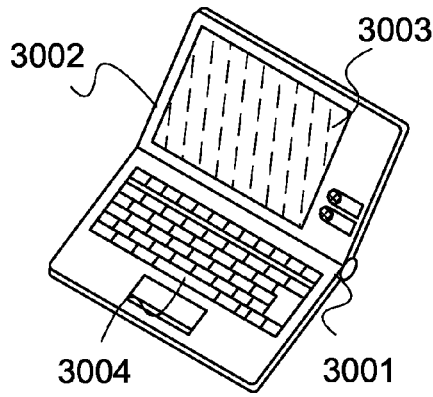
FIGS. 5A to 5F each illustrate one mode of an electronic device.

FIG. 5A illustrates a laptop personal computer, which includes a main body 3001, a housing 3002, a display portion 3003, a keyboard 3004, and the like. The liquid crystal display device described in any of the above embodiments is used for the display portion 3003, whereby low voltage driving and a reduction in power consumption of the laptop personal computer can be achieved.

Figure 5B:
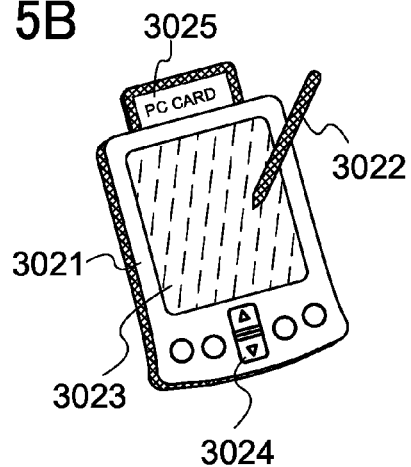

FIG. 5B illustrates a personal digital assistant (PDA), which includes a main body 3021 provided with a display portion 3023, an external interface 3025, operation buttons 3024, and the like. A stylus 3022 is provided as an accessory for operation. The liquid crystal display device described in any of the above embodiments is used for the display portion 3023, whereby low voltage driving and a reduction in power consumption of the personal digital assistant (PDA) can be achieved.

Figure 5C:
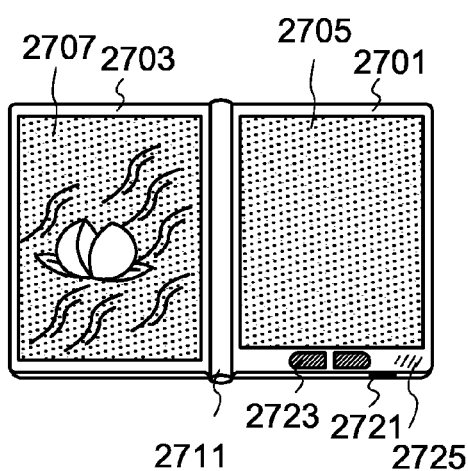

FIG. 5C illustrates an e-book reader, which includes two housings, a housing 2701 and a housing 2703. The housing 2701 and the housing 2703 are combined with a hinge 2711 so that the e-book reader can be opened and closed with the hinge 2711 as an axis. With such a structure, the e-book reader can operate like a paper book.

A display portion 2705 and a display portion 2707 are incorporated in the housing 2701 and the housing 2703, respectively. The display portion 2705 and the display portion 2707 may display one image or different images. In the structure where different images are displayed in the above display portions, for example, the right display portion (the display portion 2705 in FIG. 5C) can display text and the left display portion (the display portion 2707 in FIG. 5C) can display images. The liquid crystal display device described in any of the above embodiments is used for the display portions 2705 and 2707, whereby low voltage driving and a reduction in power consumption of the e-book reader can be achieved. In the case of using a transflective or reflective liquid crystal display device as the display portion 2705, the e-book reader may be used in a comparatively bright environment; therefore, a solar cell may be provided so that power generation by the solar cell and charge of a battery can be performed. When a lithium ion battery is used as the battery, there are advantages of downsizing and the like.

FIG. 5C illustrates an example in which the housing 2701 is provided with an operation portion and the like. For example, the housing 2701 is provided with a power switch 2721, operation keys 2723, a speaker 2725, and the like. With the operation keys 2723, pages can be turned. Note that a keyboard, a pointing device, or the like may also be provided on the surface of the housing, on which the display portion is provided. Furthermore, an external connection terminal (an earphone terminal, a USB terminal, or the like), a recording medium insertion portion, and the like may be provided on the back surface or the side surface of the housing. Further, the e-book reader may have a function of an electronic dictionary.

The e-book reader may transmit and receive data wirelessly. Through wireless communication, desired book data or the like can be purchased and downloaded from an electronic book server.

Figure 5D:
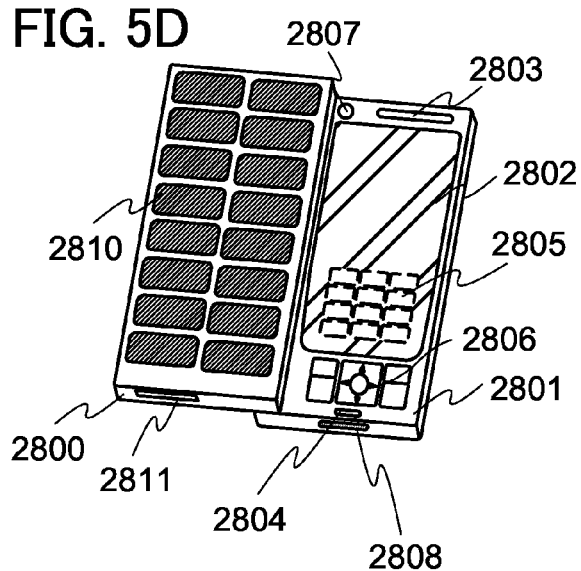

FIG. 5D illustrates a mobile phone, which includes two housings, a housing 2800 and a housing 2801. The housing 2801 includes a display panel 2802, a speaker 2803, a microphone 2804, a pointing device 2806, a camera lens 2807, an external connection terminal 2808, and the like. In addition, the housing 2800 includes a solar cell 2810 having a function of charge of the mobile phone, an external memory slot 2811, and the like. An antenna is incorporated in the housing 2801. The liquid crystal display device described in any of the above embodiments is used for the display panel 2802, whereby low voltage driving and a reduction in power consumption of the mobile phone can be achieved.

Further, the display panel 2802 is provided with a touch panel. A plurality of operation keys 2805 which is displayed as images is illustrated by dotted lines in FIG. 5D. Note that a boosting circuit by which voltage output from the solar cell 2810 is increased to be sufficiently high for each circuit is also provided.

The display direction of the display panel 2802 is changed as appropriate depending on a usage pattern. Further, the camera lens 2807 is provided on the same surface as the display panel 2802, so that the mobile phone can be used as a video phone. The speaker 2803 and the microphone 2804 can be used for videophone calls, recording and playing sound, and the like as well as voice calls. Furthermore, the housings 2800 and 2801 which are developed as illustrated in FIG. 5D can overlap with each other by sliding; thus, the size of the mobile phone can be decreased, which makes the mobile phone suitable for being carried.

The external connection terminal 2808 can be connected to an AC adapter and various types of cables such as a USB cable, and charge and data communication with a personal computer are possible. Moreover, a large amount of data can be stored by inserting a storage medium into the external memory slot 2811 and can be moved.

Further, in addition to the above functions, an infrared communication function, a television reception function, or the like may be provided.

Figure 5E:
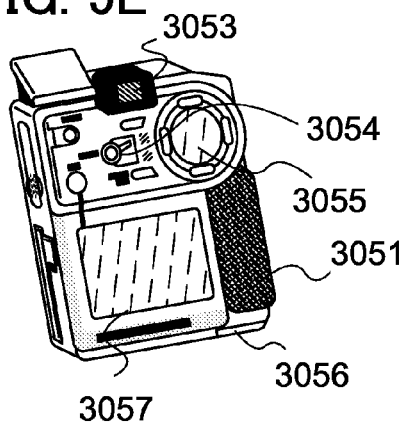

FIG. 5E illustrates a digital video camera, which includes a main body 3051, a display portion A 3057, an eyepiece 3053, an operation switch 3054, a display portion B 3055, a battery 3056, and the like. The liquid crystal display device described in any of the above embodiments is used for the display portion A 3057 and the display portion B 3055, whereby low voltage driving and a reduction in power consumption of the digital video camera can be achieved.

Figure 5F:
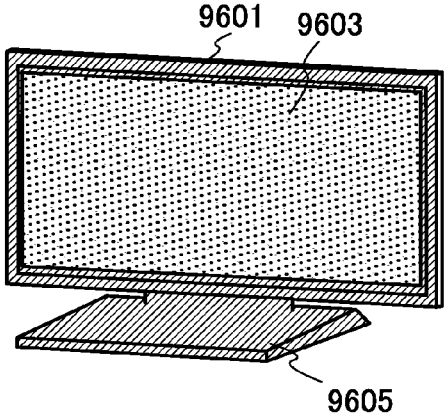

FIG. 5F illustrates a television set, which includes a housing 9601, a display portion 9603, and the like. The display portion 9603 can display images. Here, the housing 9601 is supported by a stand 9605. The liquid crystal display device described in any of the above embodiments is used for the display portion 9603, whereby low voltage driving and a reduction in power consumption of the television set can be achieved.

The television set can operate with an operation switch of the housing 9601 or a separate remote controller. Further, the remote controller may be provided with a display portion for displaying data output from the remote controller.

Note that the television set is provided with a receiver, a modem, and the like. With the use of the receiver, general television broadcasting can be received. Moreover, when the television set is connected to a communication network with or without wires via the modem, one-way (from a sender to a receiver) or two-way (between a sender and a receiver or between receivers) data communication can be performed.

The structures, the methods, and the like described in this embodiment can be combined as appropriate with any of the structures, the methods, and the like described in the other embodiments.

Example 1

In this example, a synthesis example of 2,5-difluoro-4'-(trans-4-n-propylcyclohexyl)biphenyl (abbreviation: CPP-3FHHF) represented by Structural Formula (100) in Embodiment 2 will be described.

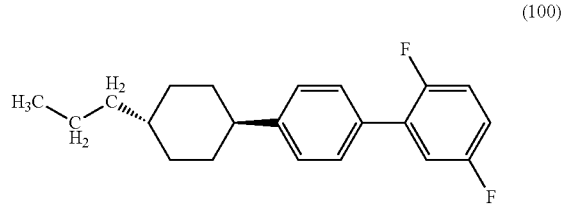 [SMILES: CCC[C@H]1CC[C@H](c2ccc(-c3cc(F)ccc3F)cc2)CC1]

(100)

A synthesis scheme of 2,5-difluoro-4'-(trans-4-n-propyl-cyclohexyl)biphenyl (abbreviation: CPP-3FHHF) represented by Structural Formula (100) is shown in (E1-1) below.

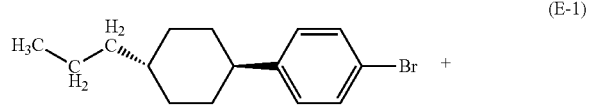

(E-1)

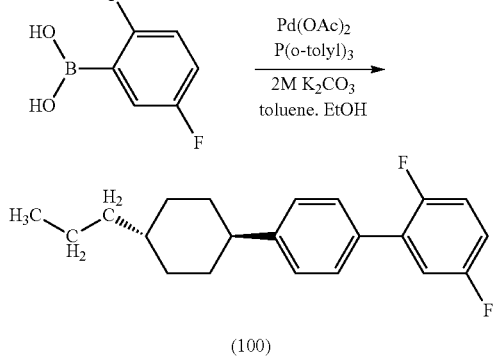

(100)

Into a flask were put 2.7 g (9.5 mmol) of 1-bromo-4-(trans-4-n-propylcyclohexyl)benzene, 1.8 g (11 mmol) of 2,5-difluorophenylboronic acid, 0.14 g (0.48 mmol) of tris (2-methylphenyl)phosphine, 23 mL of toluene, 23 mL of ethanol, and 9.5 mL of a 2M aqueous solution of potassium carbonate, the mixture was degassed while being stirred under reduced pressure, and then, the air in the flask was replaced with nitrogen.

Then, 21 mg (0.10 mmol) of palladium(II) acetate was added to this mixture, and the mixture was stirred at 90° C. for 3.5 hours. Ethyl acetate and water were added to the obtained mixture to extract an organic layer, and an aqueous layer was subjected to extraction with ethyl acetate. The obtained solution of the extract was combined with the organic layer, washed with water and a saturated aqueous solution of sodium chloride, and then dried with magnesium sulfate. This mixture was separated by gravity filtration and the filtrate was concentrated and suction-filtered through Celite (produced by Wako Pure Chemical Industries, Ltd., Catalog No. 531-16855), alumina, and Florisil (produced by Wako Pure Chemical Industries, Ltd., Catalog No. 540-00135). This mixture was purified by silica gel column chromatography (developing solvent: chloroform).

The obtained fraction was concentrated and subjected to vacuum drying to give a colorless oily substance. This oily substance was purified by high performance liquid column chromatography (HPLC) (developing solvent: chloroform). The obtained fraction was concentrated to give 0.41 g of a white solid, which was a target substance, in a yield of 14%. By a train sublimation method, this solid was purified. In the purification by sublimation, the white solid was heated at 115° C. under a pressure of 2.6 Pa with a flow rate of argon of 10 mL/min. After the purification by sublimation, 0.14 g of a white solid of 2,5-difluoro-4'-(trans-4-n-propylcyclo-hexyl)biphenyl, which was the target substance, was obtained at a collection rate of 34%.

This compound was identified as 2,5-difluoro-4'-(trans-4-n-propylcyclohexyl)biphenyl (CPP-3FHHF), which was the target substance, by nuclear magnetic resonance (NMR) spectrometry.

Figure 6A:
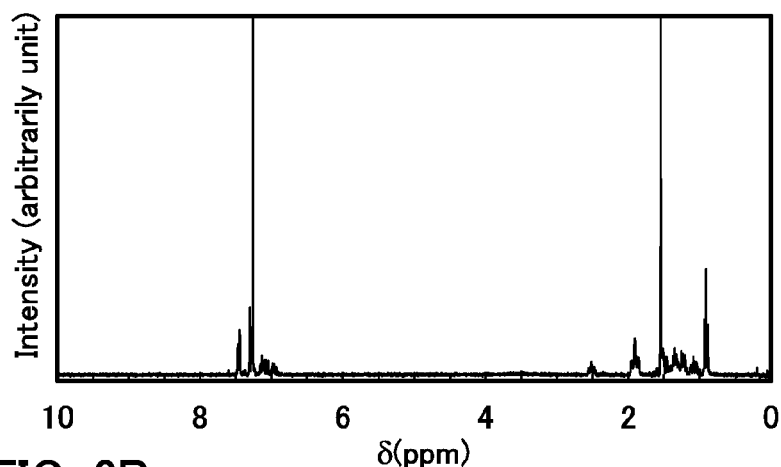
FIGS. 6A to 6C are $^1$H NMR charts of CPP-3FHHF.
Figure 6B:
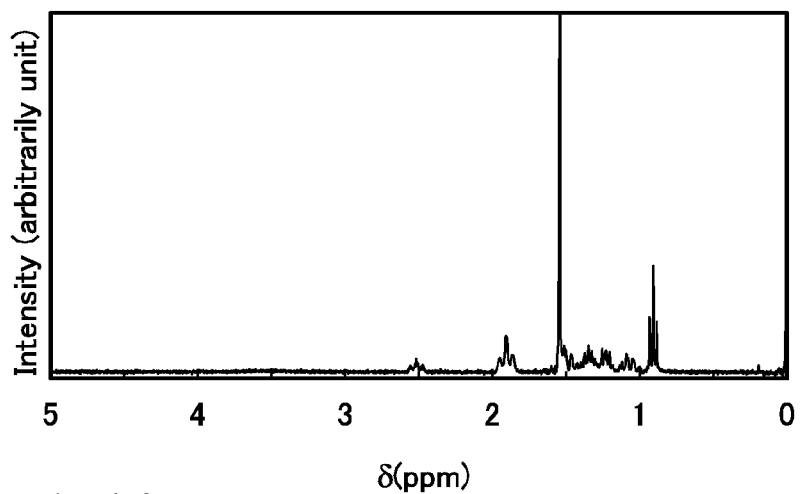
Figure 6C:
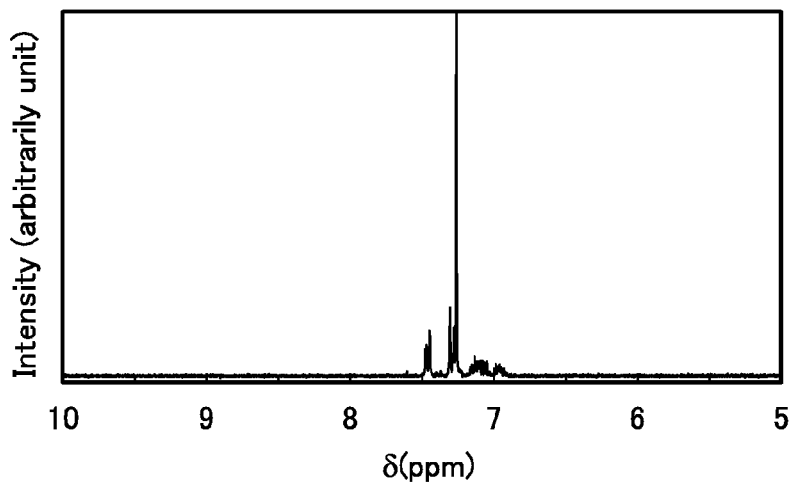

The $^1$H NMR data of CPP-3FHHF (abbreviation), the obtained substance, is shown below. FIGS. 6A to 6C show NMR charts. FIG. 6B is an enlarged chart showing a range of 0 ppm to 5.0 ppm in FIG. 6A. FIG. 6C is an enlarged chart showing a range of 5.0 ppm to 10 ppm in FIG. 6A.

$^1$H NMR (CDCl$_3$, 300 MHz): δ (ppm)=0.91 (t, 3H), 1.00-1.51 (m, 9H), 1.87-1.95 (m, 4H), 2.47-2.56 (m, 1H), 6.96-7.16 (m, 3H), 7.29 (d, 2H), 7.46 (d, 2H).

Example 2

In this example, a synthesis example of 2,6-dimethyl-4'-(trans-4-n-propylcyclohexyl)biphenyl (abbreviation: CPP- 3MeHHHMe) represented by Structural Formula (200) in Embodiment 2 will be described.

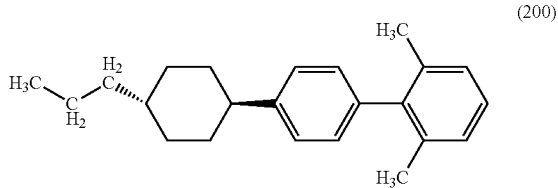 [SMILES: CCC[C@H]1CC[C@H](c2ccc(-c3c(C)cccc3C)cc2)CC1]

(200)

A synthesis scheme of 2,6-dimethyl-4'-(trans-4-n-propylcyclohexyl)biphenyl (abbreviation: CPP-3MeHHHMe) represented by Structural Formula (200) is shown in (E2-1) below.

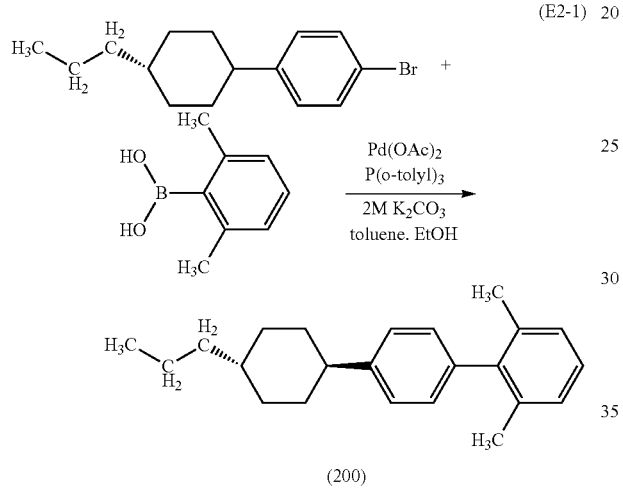

(E2-1)

Into a flask were put 2.8 g (9.8 mmol) of 1-bromo-4-(trans-4-n-propylcyclohexyl)benzene, 1.8 g (12 mmol) of 2,6-dimethylphenylboronic acid, 0.15 g (0.49 mmol) of tris(2-methylphenyl)phosphine, 25 mL of toluene, 25 mL of ethanol, and 9.8 mL of a 2M aqueous solution of potassium carbonate, the mixture was degassed while being stirred under reduced pressure, and then, the air in the flask was replaced with nitrogen.

Then, 22 mg (0.10 mmol) of palladium(II) acetate was added to this mixture, and the mixture was stirred at 90° C. for 2.5 hours. Ethyl acetate and water were added to the obtained mixture to extract an organic layer, and an aqueous layer was subjected to extraction with ethyl acetate. The obtained solution of the extract was combined with the organic layer, washed with water and a saturated aqueous solution of sodium chloride, and then dried with magnesium sulfate. This mixture was separated by gravity filtration and the filtrate was concentrated and suction-filtered through Celite, alumina, and Florisil. This mixture was purified by silica gel column chromatography (developing solvent: chloroform).

The obtained fraction was concentrated and subjected to vacuum drying to give a yellow solid. This solid was purified by high performance liquid column chromatography (HPLC) (developing solvent: chloroform). The obtained fraction was concentrated to give 2.2 g of a pale yellow solid, which was a target substance, in a yield of 73%.

By a train sublimation method, this solid was purified. In the purification by sublimation, the pale yellow solid was heated at 126° C. under a pressure of 2.6 Pa with a flow rate of argon of 10 mL/min. After the purification by sublimation, 1.1 g of a white solid of 2,6-dimethyl-4'-(trans-4-n-propylcyclohexyl)biphenyl, which was the target substance, was obtained at a collection rate of 50%.

This compound was identified as 2,6-dimethyl-4'-(trans-4-n-propylcyclohexyl)biphenyl (CPP-3MeHHHMe), which was the target substance, by nuclear magnetic resonance (NMR) spectrometry.

Figure 7A:
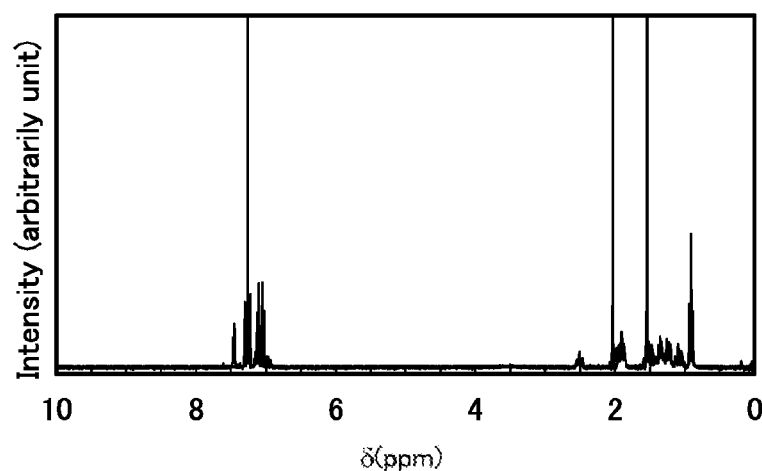
FIGS. 7A to 7C are $^1$H NMR charts of CPP-3MeHHHMe.
Figure 7B:
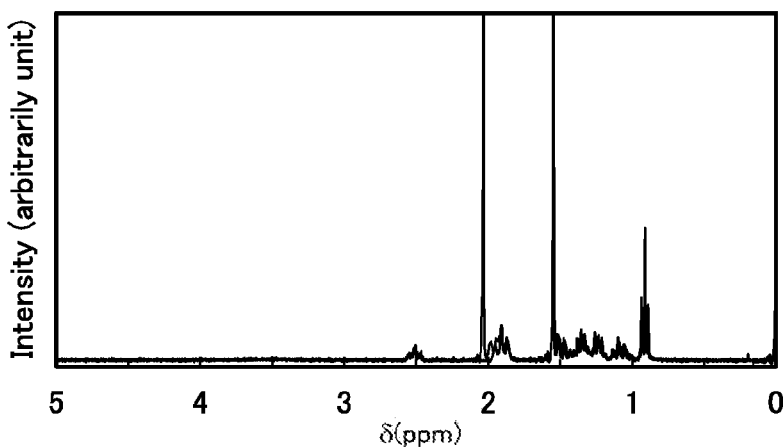
Figure 7C:
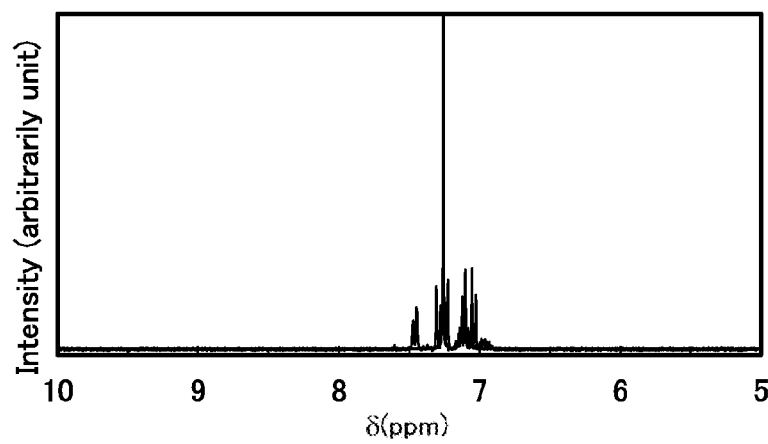

The $^1$H NMR data of CPP-3MeHHHMe (abbreviation), the obtained substance, is shown below. FIGS. 7A to 7C show NMR charts. FIG. 7B is an enlarged chart showing a range of 0 ppm to 5.0 ppm in FIG. 7A. FIG. 7C is an enlarged chart showing a range of 5.0 ppm to 10 ppm in FIG. 7A.

$^1$H NMR (CDCl$_3$, 300 MHz): δ (ppm)=0.91 (t, 3H), 1.01-1.59 (m, 9H), 1.87-1.98 (m, 4H), 2.03 (s, 6H), 2.47-2.55 (m, 1H), 7.03-7.17 (m, 5H), 7.24 (d, 2H).

Figure 8:
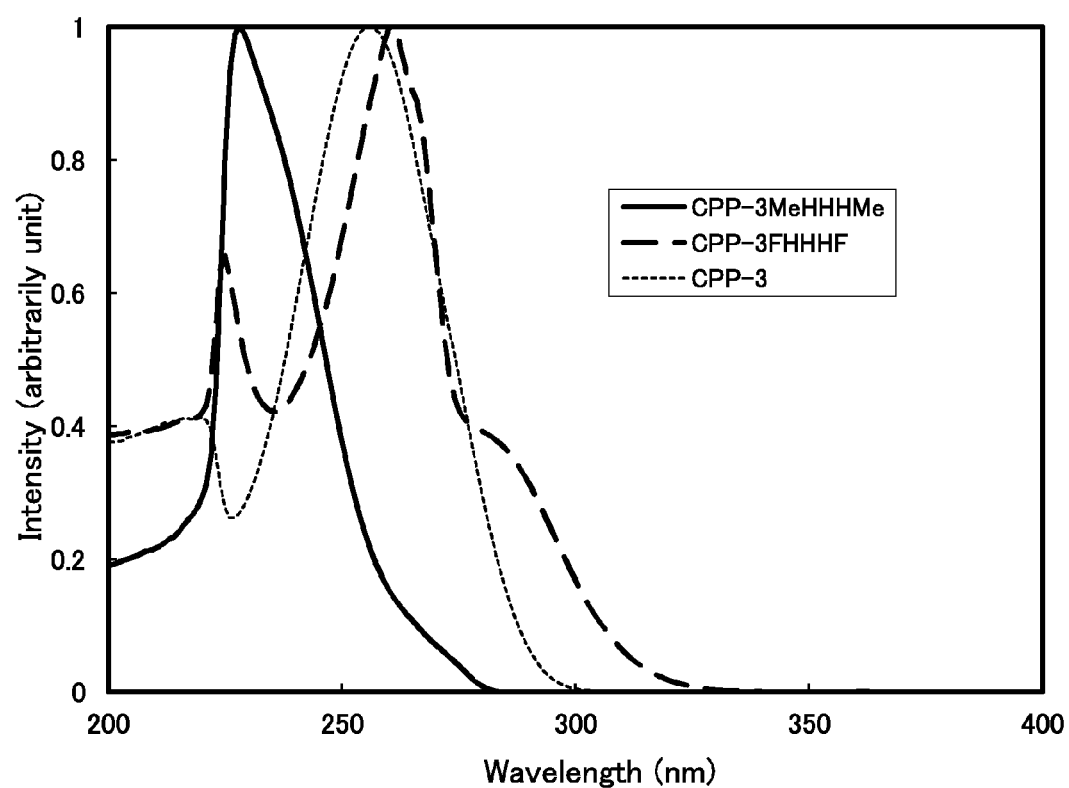
FIG. 8 shows absorption spectra of CPP-3MeHHHMe, CPP-3, and CPP-3FHHHF.

FIG. 8 shows an absorption spectrum of a dichloromethane solution of CPP-3MeHHHMe (abbreviation). FIG. 8 also shows, as comparative examples, absorption spectra of dichloromethane solutions of 4-(trans-4-n-propylcyclohexyl)biphenyl (abbreviation: CPP-3) and 2,6-difluoro-4'-(trans-4-n-propylcyclohexyl)biphenyl (abbreviation: CPP-3FHHHF) in each of which no methyl groups are bonded to the 2- and 6-positions of a phenyl group. Note that structural formulae of the organic compounds as the comparative examples in FIG. 8 are shown below.

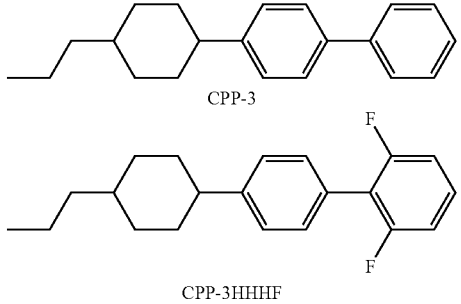

CPP-3

CPP-3HHHF

The absorption spectra in FIG. 8 were measured using an ultraviolet-visible spectrophotometer (V-550, produced by JASCO Corporation). The absorption spectra in FIG. 8 were each obtained by subtracting a measured absorption spectrum of only dichloromethane that was put in a quartz cell from the measured absorption spectrum of the dichloromethane solution in a quartz cell. In FIG. 8, the horizontal axis indicates a wavelength (nm) and the vertical axis indicates intensity (arbitrary unit).

FIG. 8 shows that the absorption spectrum of CPP-3MeHHHMe (abbreviation) in this example has a peak at approximately 230 nm, and that the absorption spectra of CPP-3 (abbreviation) and CPP-3FHHHF (abbreviation) which are the comparative examples have peaks at approximately 255 nm and approximately 260 nm, respectively. This reveals that CPP-3MeHHHMe (abbreviation) in this example, in which methyl groups are bonded to the 2- and 6-positions of a phenyl group, shows the peak in the absorption spectrum on a shorter wavelength side than the peaks in the absorption spectra of the compounds in each of which no methyl groups are bonded to the 2- and 6-positions of the phenyl group.

Example 3

In this example, a synthesis example of 2-fluoro-4'-(trans-4-n-propylcyclohexyl)biphenyl (abbreviation: N-CPP(F)-3) represented by Structural Formula (112) in Embodiment 2 will be described.

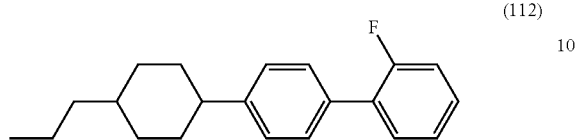

(112)

<Step 1: Synthesis of 2-Fluoro-4'-(trans-4-n-propylcyclohexyl)biphenyl (abbreviation: N-CPP(F)-3)>

Into a flask were put 1.0 g (4.1 mmol) of 4-(trans-4-n-propylcyclohexyl)phenylboronic acid, 0.85 g (4.9 mmol) of 2-bromofluorobenzene, 0.062 g (0.20 mmol) of tris(2-methylphenyl)phosphine, 20 mL of toluene, 20 mL of ethanol, and 4.9 mL of a 2M aqueous solution of potassium carbonate, the mixture was degassed while being stirred under reduced pressure, and then, the air in the flask was replaced with nitrogen.

Then, 9.1 mg (0.041 mmol) of palladium(II) acetate was added to this mixture, and the mixture was stirred at 90° C. for 3 hours. Toluene and water were added to the obtained mixture to extract an organic layer, and an aqueous layer was subjected to extraction with toluene. The obtained solution of the extract was combined with the organic layer, washed with water and a saturated aqueous solution of sodium chloride, and then dried with magnesium sulfate. This mixture was separated by gravity filtration and the filtrate was concentrated and suction-filtered through Celite, alumina, and Florisil. This mixture was purified by silica gel column chromatography (developing solvent: hexane).

The obtained fraction was concentrated to give a white solid. This solid was purified by high performance liquid column chromatography (HPLC) (developing solvent: chloroform). The obtained fraction was concentrated to give 0.80 g of a white solid, which was a target substance, in a yield of 67%.

By a train sublimation method, this solid was purified. In the purification by sublimation, the white solid was heated at 80° C. under a pressure of 5.0 Pa with a flow rate of argon of 10 mL/min. After the purification by sublimation, 0.58 g of a white solid of 2-fluoro-4'-(trans-4-n-propylcyclohexyl)biphenyl (abbreviation: N-CPP(F)-3), which was the target substance, was obtained at a collection rate of 73%. A synthesis scheme of Step 1 is shown in (E3-1) below.

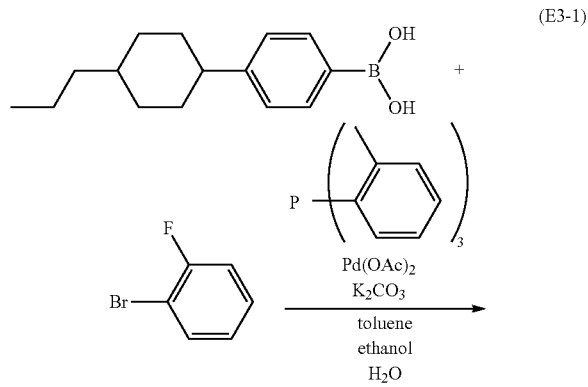

(E3-1)

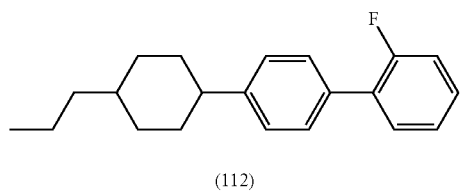

(112)

Figure 9:
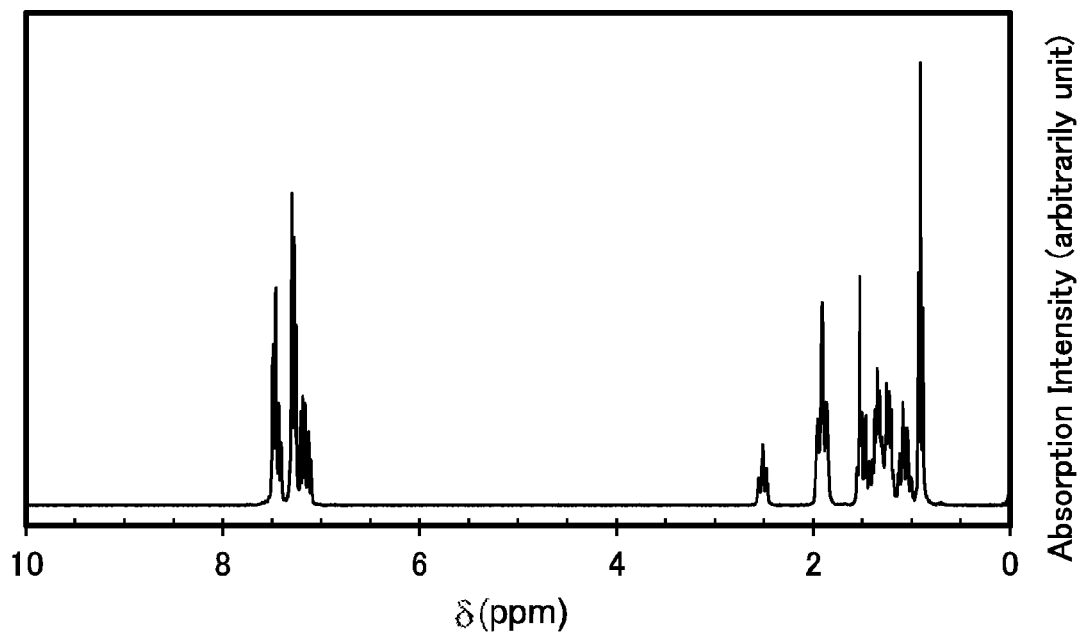
FIG. 9 is a $^1$H NMR chart of N-CPP(F)-3.

The $^1$H NMR data of N-CPP(F)-3 (abbreviation), the obtained substance, is shown below. FIG. 9 shows an NMR chart.

$^1$H NMR (CDCl$_3$, 300 MHz): δ (ppm)=0.91 (t, 3H), 1.01-1.56 (m, 9H), 1.87-1.96 (m, 4H), 2.47-2.55 (m, 1H), 7.10-7.32 (m, 5H), 7.40-7.50 (m, 2H).

Figure 10:
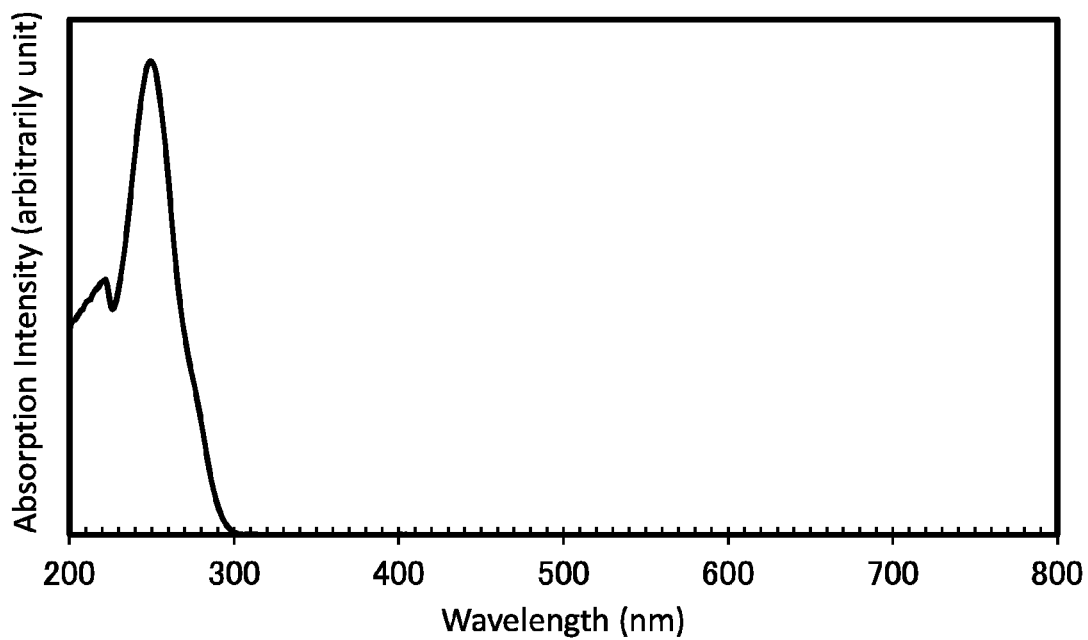
FIG. 10 shows an absorption spectrum of N-CPP(F)-3.

FIG. 10 shows an absorption spectrum of a dichloromethane solution of N-CPP(F)-3 (abbreviation).

Example 4

In this example, liquid crystal elements were formed and voltage holding characteristics thereof were examined. Samples 11 to 14 and Comparative Samples 11 and 12 that are liquid crystal compositions were used to form the liquid crystal elements. Samples 11 to 14 contained one of CPP-3MeHHHMe (abbreviation) and N-CPP(F)-3 (abbreviation), which are the organic compounds of embodiments of the present invention synthesized in Examples 2 and 3, respectively. Comparative Samples 11 and 12 did not contain any of the organic compounds of embodiments of the present invention.

Components of the liquid crystal compositions used in the liquid crystal elements in this example are listed in Table 1 (Sample 11), Table 2 (Sample 12), Table 3 (Sample 13), and Table 4 (Sample 14). The ratios (the mixture ratios) are all represented in weight ratios.

TABLE 1

| Component | Ratio (wt %) |
|---|---|
| MLC-7030 | 95.04 |
| CPP-3MeHHHMe | 4.96 |

TABLE 2

| Component | Ratio (wt %) |
|---|---|
| E-8 | 95.01 |
| CPP-3MeHHHMe | 4.99 |

TABLE 3

| Component | Ratio (wt %) |
|---|---|
| MLC-7030 | 94.94 |
| N-CPP(F)-3 | 5.06 |

TABLE 4

| Component | Ratio (wt %) |
|---|---|
| E-8 | 95.01 |
| N-CPP(F)-3 | 4.99 |

Comparative Sample 11 was the mixed liquid crystal MLC-7030 (produced by Merck Ltd.) used as the base material in Samples 11 and 13, and neither CPP-3MeHH-HMe (abbreviation) nor N-CPP(F)-3 (abbreviation) was added to Comparative Sample 11. Comparative Sample 12 was the mixed liquid crystal E-8 (produced by LCC Corporation) used as the base material in Samples 12 and 14, and neither CPP-3MeHHHMe (abbreviation) nor N-CPP (F)-3 (abbreviation) was added to Comparative Sample 12. The mixed liquid crystals MLC-7030 and E-8 each have a positive dielectric constant anisotropy.

The liquid crystal elements including Samples 11 to 14 were each formed in the following manner. Glass substrates each provided with a transparent electrode layer and an alignment film were bonded using a sealant so that the alignment films were positioned between the glass substrates and a space (2 µm) was provided between the alignment films. Then, the liquid crystal compositions formed by mixing the materials in Tables 1 to 4 in the listed ratios were stirred in an isotropic phase and injected between the substrates by an injection method.

The liquid crystal elements including Comparative Samples 11 and 12 were each formed by injecting the mixed liquid crystal MLC-7030 or the mixed liquid crystal E-8 into a similar cell.

The transparent electrode layer was formed using indium tin oxide containing silicon oxide (ITSO) by a sputtering method. Note that the thickness of the transparent electrode layer was 110 nm. A thermosetting sealant was used as the sealant, which was cured by being subjected to heat treatment at 160° C. for 6 hours under a pressure of 0.3 kgf/cm$^2$.

After that, voltage holding ratios of these samples were measured with the use of the LC material characteristics measurement system model 6254 (manufactured by TOYO Corporation). Measurement conditions were as follows: a selection period was 60 µsec, a non-selection period was 16.67 msec, voltage applied during the selection period was 5 V, and measurement temperature was 30° C. The ratio of the holding voltage after 16.67 msec to the applied voltage of 5 V was measured as the voltage holding ratio.

Figure 11A:
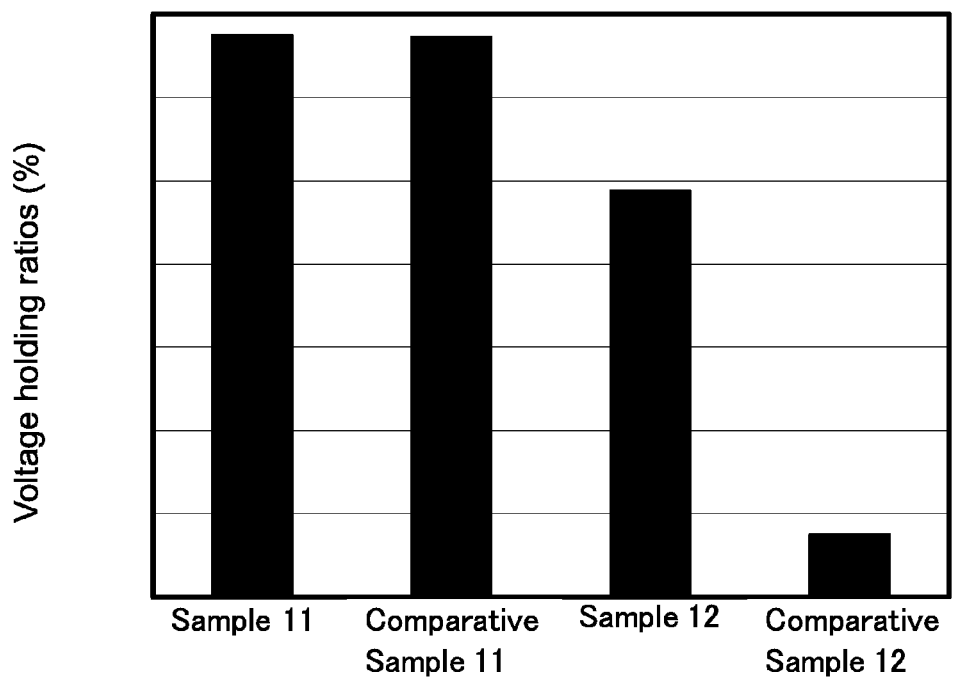
FIGS. 11A and 11B each show the voltage holding ratios of liquid crystal elements formed in Example.

The voltage holding ratios of Samples 11 and 12 and Comparative Samples 11 and 12 are shown in FIG. 11A.

As shown in FIG. 11A, Sample 11, in which CPP-3MeHHHMe (abbreviation) was added to MLC-7030 (Comparative Sample 11) having a high voltage holding ratio, exhibits voltage holding characteristics equivalent to those of Comparative Sample 11. This reveals that addition of CPP-3MeHHHMe (abbreviation) does not impair the voltage holding characteristics of MLC-7030 and the high voltage holding characteristics can be maintained. Meanwhile, Sample 12 in which CPP-3MeHHHMe (abbreviation) was added to E-8 (Comparative Sample 12) having a low voltage holding ratio exhibits higher voltage holding characteristics than Comparative Sample 12. This reveals that addition of CPP-3MeHHHMe (abbreviation) allows formation of a liquid crystal element with a high voltage holding ratio regardless of the base material in the liquid crystal composition.

Figure 11B:
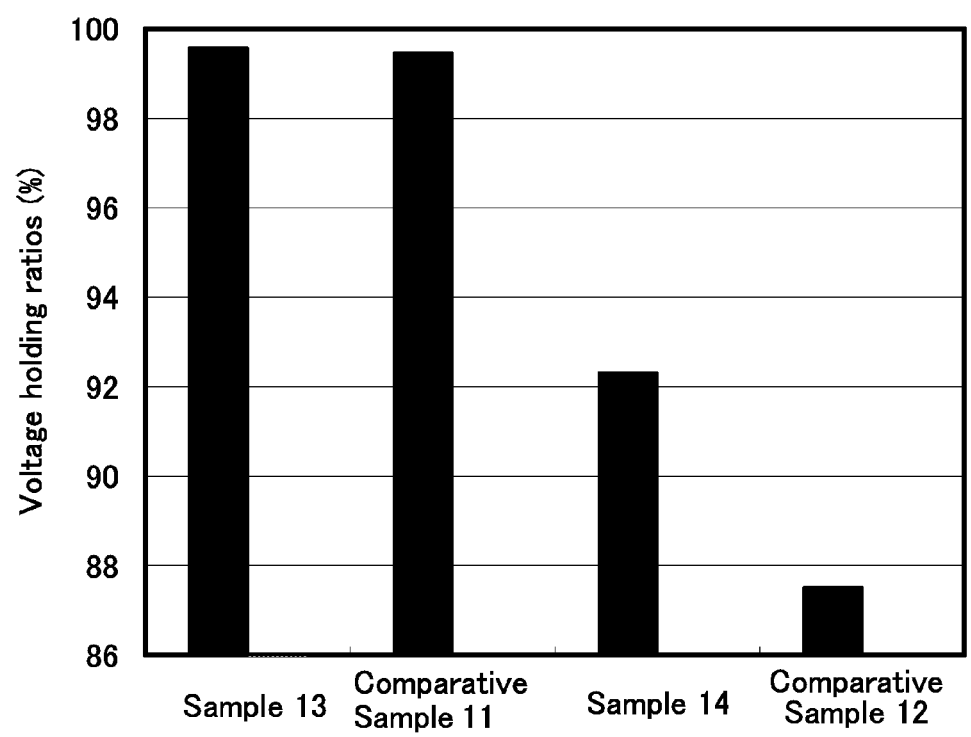

The voltage holding ratios of Samples 13 and 14 and Comparative Samples 11 and 12 are shown in FIG. 11B.

As shown in FIG. 11B, Sample 13, in which N-CPP(F)-3 (abbreviation) was added to MLC-7030 (Comparative Sample 11) having a high voltage holding ratio, exhibits voltage holding characteristics equivalent to those of Comparative Sample 11. This reveals that addition of N-CPP (F)-3 (abbreviation) does not impair the voltage holding characteristics of MLC-7030 and the high voltage holding characteristics can be maintained. Meanwhile, Sample 14 in which N-CPP(F)-3 (abbreviation) was added to E-8 (Comparative Sample 12) having a low voltage holding ratio exhibits higher voltage holding characteristics than Comparative Sample 12. This reveals that addition of N-CPP (F)-3 (abbreviation) allows formation of a liquid crystal element with a high voltage holding ratio regardless of the base material in the liquid crystal composition.

Accordingly, when a liquid crystal composition containing CPP-3MeHHHMe (abbreviation) or N-CPP(F)-3 (abbreviation) that is the organic compound of one embodiment of the present invention is used in a liquid crystal element, the liquid crystal element can have a high voltage holding ratio. This is presumably because a liquid crystal composition containing CPP-3MeHHHMe (abbreviation) or N-CPP(F)-3 (abbreviation) that is the organic compound of one embodiment of the present invention has high resistivity.

Samples 11 to 14 in this example have a high voltage holding ratio; thus, when a liquid crystal element including any of the samples is used for a liquid crystal display device, power consumption of the liquid crystal display device can be reduced. In addition, even when a driving method with a lower refresh rate is employed, driving can be performed without loss of display quality.

Example 5

In this example, a synthesis example of 2-fluoro-3-[4-(trans-4-n-pentylcyclohexyl)phenyl]pyridine (abbreviation: N-CPPy(F)-5) represented by Structural Formula (301) in Embodiment 3 will be described.

(301)

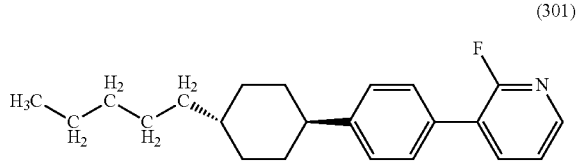 [SMILES: CCCCC[C@H]1CC[C@H](c2ccc(-c3cccnc3F)cc2)CC1]

<Step 1: Synthesis of 4-(trans-4-n-Pentylcyclohexyl)phenylboronic Acid>

Into a 300-mL three-neck flask were put 6.8 g (22 mmol) of 1-bromo-4-(trans-4-n-pentylcyclohexyl)benzene and 118 mL of tetrahydrofuran (THF), and the mixture was stirred at −80° C. Into this mixture, 15 mL (24 mmol) of butyl lithium was dropped, and stirring was performed at −80° C. for 2 hours. To this mixture was added 3.2 mL (29 mmol) of trimethylborate, and the mixture was stirred at room temperature for 24 hours. To this mixture was added a dilute hydrochloric acid, and stirring was performed at room temperature for 1 hour.

The obtained mixture was neutralized with a saturated aqueous solution of sodium hydrogen carbonate. An organic layer was extracted and an aqueous layer was subjected to extraction with ethyl acetate. The obtained solution of the extract was combined with the organic layer, washed with water and a saturated aqueous solution of sodium chloride, and then dried with magnesium sulfate. This mixture was separated by gravity filtration, and the filtrate was concentrated to give a white solid. Hexane was added to the resulting solid and the mixture was irradiated with ultrasonic waves. A solid was separated by suction filtration, whereby 2.9 g of a white solid of 4-(trans-4-n-pentylcyclohexyl)phenylboronic acid, which was a target substance, was obtained in a yield of 48%. A synthesis scheme of Step 1 is shown in (E4-1) below.

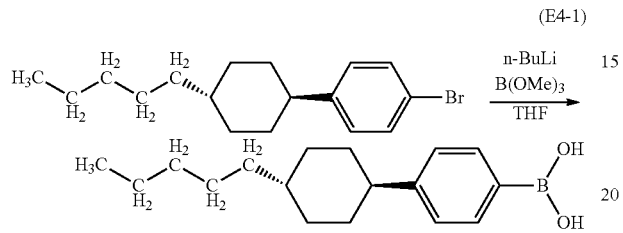

(E4-1)

<Step 2: Synthesis of 2-Fluoro-3-[4-(trans-4-n-pentylcyclohexyl)phenyl]pyridine>

Into a flask were put 0.90 g (5.1 mmol) of 3-bromo-2-fluoropyridine, 1.4 g (5.1 mmol) of 4-(trans-4-n-propylcyclohexyl)phenylboronic acid, 80 mg (0.26 mmol) of tris(2-methylphenyl)phosphine, 13 mL of toluene, 13 mL of ethanol, and 5.1 mL of a 2M aqueous solution of potassium carbonate, the mixture was degassed while being stirred under reduced pressure, and then, the air in the flask was replaced with nitrogen. Then, 12 mg (51 μmol) of palladium (II) acetate was added to this mixture, and the mixture was stirred at 90° C. for 17.5 hours.

Ethyl acetate and water were added to the obtained mixture to extract an organic layer, and an aqueous layer was subjected to extraction with ethyl acetate. The obtained solution of the extract was combined with the organic layer, washed with water and a saturated aqueous solution of sodium chloride, and then dried with magnesium sulfate. This mixture was separated by gravity filtration and the filtrate was concentrated and suction-filtered through Celite (produced by Wako Pure Chemical Industries, Ltd., Catalog No. 531-16855), alumina, Florisil (produced by Wako Pure Chemical Industries, Ltd., Catalog No. 540-00135), and silica gel. The obtained filtrate was concentrated to give a pale brown solid. This solid was purified by high performance liquid column chromatography (HPLC) (developing solvent: chloroform). The obtained fraction was concentrated to give 0.74 g of a white solid, which was a target substance, in a yield of 46%. By a train sublimation method, this solid was purified. In the purification by sublimation, the white solid was heated at 135° C. under a pressure of 2.6 Pa with a flow rate of argon of 10 mL/min. After the purification by sublimation, 0.33 g of a white solid of 2-fluoro-3-[4-(trans-4-n-pentylcyclohexyl)phenyl]pyridine, which was the target substance, was obtained at a collection rate of 45%. A synthesis scheme of Step 2 is shown in (E4-2) below.

(E4-2)

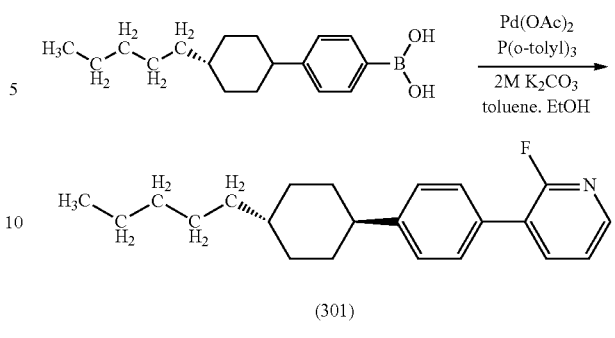

(301)

This compound was identified as 2-fluoro-3-[4-(trans-4-n-pentylcyclohexyl)phenyl]pyridine (N-CPPy(F)-5), which was the target substance, by nuclear magnetic resonance (NMR) spectrometry.

Figure 12A:
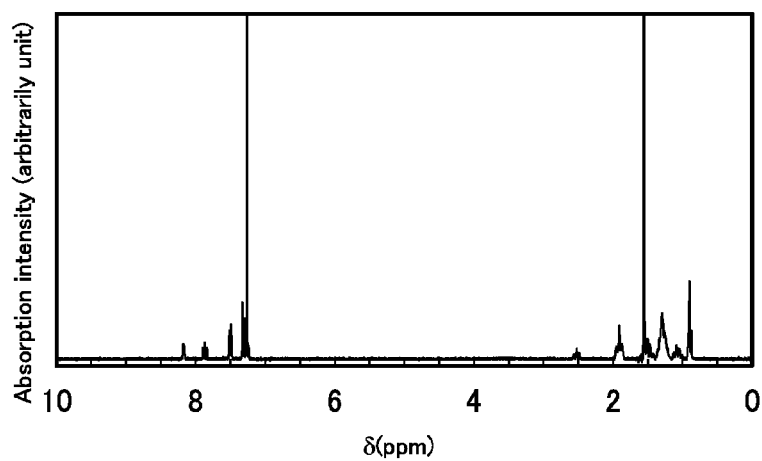
FIGS. 12A to 12C are $^1$H NMR charts of N-CPPy(F)-5.
Figure 12B:
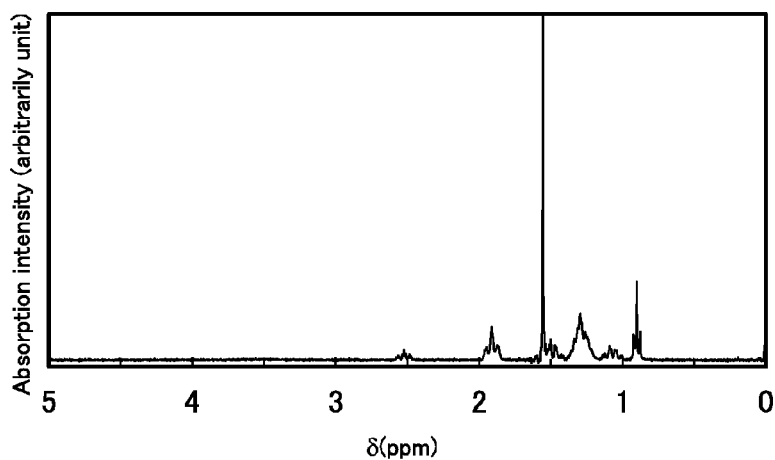
Figure 12C:
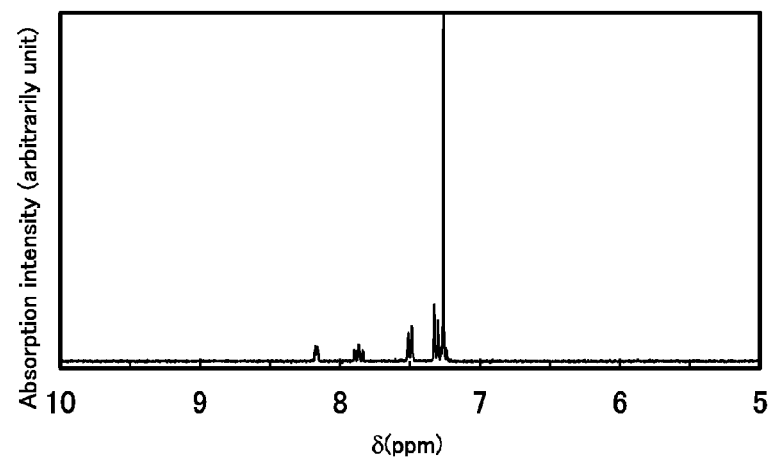

The $^1$H NMR data of N-CPPy(F)-5 (abbreviation), the obtained substance, is shown below. FIGS. 12A to 12C show NMR charts. FIG. 12B is an enlarged chart showing a range of 0 ppm to 5.0 ppm in FIG. 12A. FIG. 12C is an enlarged chart showing a range of 5.0 ppm to 10 ppm in FIG. 12A.

$^1$H NMR (CDCl$_3$, 300 MHz): δ (ppm)=0.90 (t, 3H), 1.05-1.54 (m, 13H), 1.87-1.95 (m, 4H), 2.48-2.57 (m, 1H), 7.24-7.28 (m, 1H), 7.31 (d, 2H), 7.50 (d, 2H), 7.87 (t, 1H), 8.17 (d, 1H).

Example 6

In this example, liquid crystal elements were formed and voltage holding characteristics thereof were examined. Samples 21 to 23 and Comparative Samples 21 to 23 that are liquid crystal compositions were used to form the liquid crystal elements. Samples 21 to 23 contained N-CPPy(F)-5 (abbreviation), which is the organic compound of one embodiment of the present invention synthesized in Example 5. Comparative Samples 21 to 23 did not contain any of the organic compounds of embodiments of the present invention.

Components of the liquid crystal compositions used in the liquid crystal elements in this example are listed in Table 5 (Sample 21), Table 6 (Sample 22), and Table 7 (Sample 23). The ratios (the mixture ratios) are all represented in weight ratios.

TABLE 5

| Component | Ratio (wt %) |
|---|---|
| MLC-7030 | 95.06 |
| N-CPPy(F)-5 | 4.94 |

TABLE 6

| Component | Ratio (wt %) |
|---|---|
| E-8 | 95.06 |
| N-CPPy(F)-5 | 4.94 |

TABLE 7

| Component | Ratio (wt %) |
|---|---|
| MLC-3006 | 95.65 |
| N-CPPy(F)-5 | 4.35 |

Comparative Sample 21 was the mixed liquid crystal MLC-7030 (produced by Merck Ltd.) used in Sample 21, and N-CPPy(F)-5 (abbreviation) was not added to Comparative Sample 21. Comparative Sample 22 was the mixed liquid crystal E-8 (produced by LCC Corporation) used in Sample 22, and N-CPPy(F)-5 (abbreviation) was not added to Comparative Sample 22. Comparative Sample 23 was the mixed liquid crystal MLC-3006 (produced by Merck Ltd.) used in Sample 23, and N-CPPy(F)-5 (abbreviation) was not added to Comparative Sample 23. The mixed liquid crystals MLC-7030 and E-8 each have a positive dielectric constant anisotropy. The mixed liquid crystal MLC-3006 has a negative dielectric constant anisotropy.

The liquid crystal elements including Samples 21 to 23 each were formed in the following manner. Glass substrates each provided with a transparent electrode layer and an alignment film were bonded using a sealant so that the alignment films were positioned between the glass substrates and a space (2 μm) was provided between the alignment films. Then, the liquid crystal compositions formed by mixing the materials in Tables 5 to 7 in the listed ratios were each stirred in an isotropic phase and injected between the substrates by an injection method.

The liquid crystal elements including Comparative Samples 21 to 23 were each formed by injecting the mixed liquid crystal MLC-7030, the mixed liquid crystal E-8, or the mixed liquid crystal MLC-3006 into a similar cell.

The transparent electrode layer was formed using indium tin oxide containing silicon oxide (ITSO) by a sputtering method. Note that the thickness of the transparent electrode layer was 110 nm. A thermosetting sealant was used as the sealant, which was cured by being subjected to heat treatment at 160° C. for 6 hours under a pressure of 0.3 kgf/cm².

After that, voltage holding ratios of these samples were measured with the use of the LC material characteristics measurement system model 6254 (manufactured by TOYO Corporation). Measurement conditions were as follows: a selection period was 60 μsec, a non-selection period was 16.67 msec, voltage applied during the selection period was 5 V, and measurement temperature was 30° C. The ratio of the holding voltage after 16.67 msec to the applied voltage of 5 V was measured as the voltage holding ratio.

Figure 13:
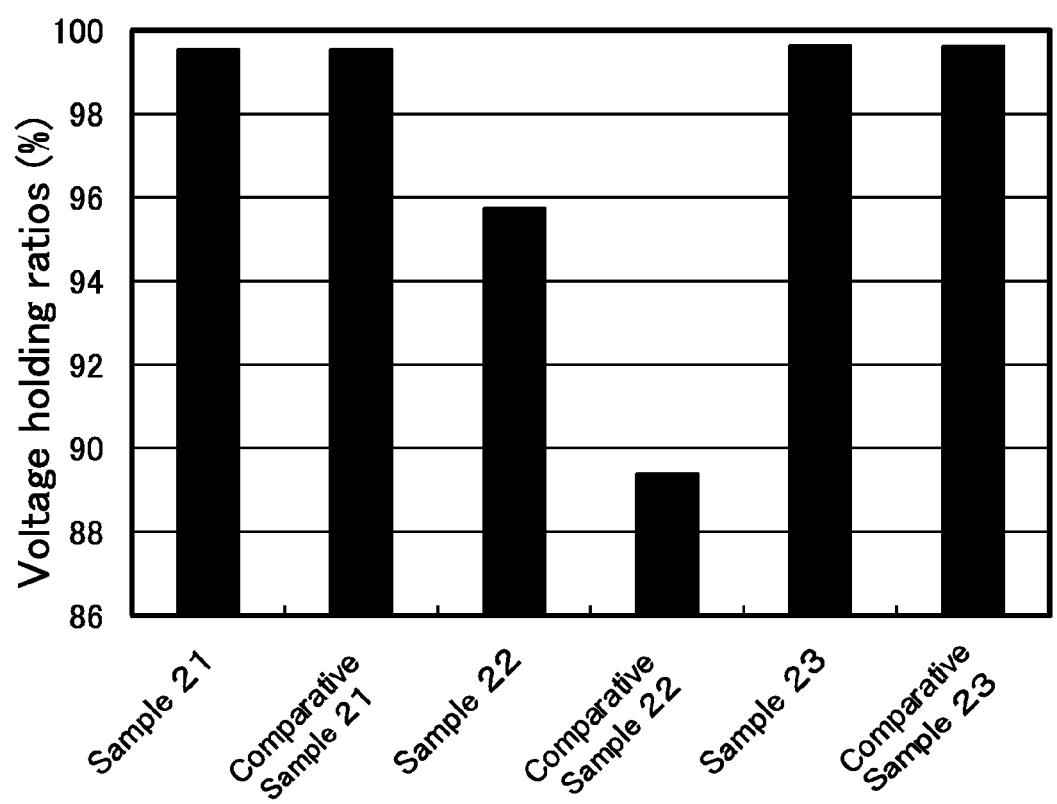
FIG. 13 shows the voltage holding ratios of liquid crystal elements formed in Example.

The voltage holding ratios of Samples 21 to 23 and Comparative Samples 21 to 23 are shown in FIG. 13.

As shown in FIG. 13, Sample 21 in which N-CPPy(F)-5 (abbreviation) was added to MLC-7030 (Comparative Sample 21) having a high voltage holding ratio exhibits voltage holding characteristics equivalent to those of Comparative Sample 21. This reveals that addition of N-CPPy(F)-5 (abbreviation) does not impair the voltage holding characteristics of MLC-7030 and the high voltage holding characteristics can be maintained. Meanwhile, Sample 22 in which N-CPPy(F)-5 (abbreviation) was added to E-8 (Comparative Sample 22) having a low voltage holding ratio exhibits higher voltage holding characteristics than Comparative Sample 22. Furthermore, Sample 23 in which N-CPPy(F)-5 (abbreviation) was added to MLC-3006 (Comparative Sample 23) having a negative dielectric constant anisotropy exhibits high voltage holding characteristics, which are equivalent to those of Comparative Sample 23. This reveals that addition of N-CPPy(F)-5 (abbreviation) allows formation of a liquid crystal element with a high voltage holding ratio regardless of the base material in the liquid crystal composition.

Accordingly, when a liquid crystal composition containing N-CPPy(F)-5 (abbreviation) that is the organic compound of one embodiment of the present invention is used in a liquid crystal element, the liquid crystal element can have a high voltage holding ratio. This is because a liquid crystal composition containing N-CPPy(F)-5 (abbreviation) that is the organic compound of one embodiment of the present invention has high resistivity.

Samples 21 to 23 in this example have a high voltage holding ratio; thus, when a liquid crystal element including any of the samples is used for a liquid crystal display device, power consumption of the liquid crystal display device can be reduced. In addition, even when a driving method with a lower refresh rate is employed, driving can be performed without loss of display quality.

REFERENCE NUMERALS

200: substrate, 201: substrate, 202a: alignment film, 202b: alignment film, 208: liquid crystal composition, 230: pixel electrode layer, 232: common electrode layer, 401: substrate, 402: pixel portion, 403: signal line driver circuit, 404: scan line driver circuit, 405: sealant, 406: substrate, 408: liquid crystal layer, 410: transistor, 411: transistor, 413: liquid crystal element, 415: connection terminal electrode, 416: terminal electrode, 418: FPC, 419: anisotropic conductive layer, 420a: gate insulating layer, 420b: gate insulating layer, 431: electrode layer, 432a: insulating layer, 432b: insulating layer, 433: insulating layer, 434: electrode layer, 435: spacer, 438: insulating layer, 440: planarization insulating layer, 442: insulating layer, 450: wiring, 452: wiring, 2701: housing, 2703: housing, 2705: display portion, 2707: display portion, 2711: hinge, 2721: power switch, 2723: operation key, 2725: speaker, 2800: housing, 2801: housing, 2802: display panel, 2803: speaker, 2804: microphone, 2805: operation key, 2806: pointing device, 2807: camera lens, 2808: external connection terminal, 2810: solar cell, 2811: external memory slot, 3001: main body, 3002: housing, 3003: display portion, 3004: keyboard, 3021: main body, 3022: stylus, 3023: display portion, 3024: operation button, 3025: external interface, 3051: main body, 3053: eyepiece, 3054: operation switch, 3056: battery, 9601: housing, 9603: display portion, and 9605: stand.

This application is based on Japanese Patent Application Ser. No. 2013-157905 filed with Japan Patent Office on Jul. 30, 2013 and Japanese Patent Application Ser. No. 2013-157912 filed with Japan Patent Office on Jul. 30, 2013, the entire contents of which are hereby incorporated by reference.

The invention claimed is:

1. An organic compound represented by General Formula (G100):

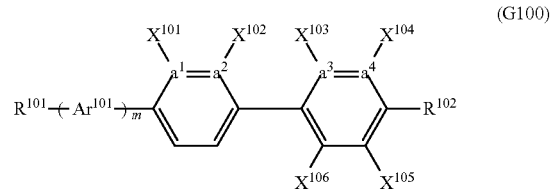

wherein:

m is 1;

$Ar^{101}$ represents a cycloalkylene group or a cycloalkenylene group;

$R^{101}$ represents an alkyl group having 1 to 11 carbon atoms or an alkoxy group having 1 to 11 carbon atoms;

$R^{102}$ represents any one of a hydrogen atom, a fluorine atom, an alkyl group having 1 to 11 carbon atoms, and an alkoxy group having 1 to 11 carbon atoms;

$a^1$-$X^{101}$, $a^2$-$X^{102}$, and $a^4$-$X^{104}$ each represent any one selected from the group of C—H, C—F, and C—$CH_3$;

$a^3$-$X^{103}$ represents C—$CH_3$;

$X^{105}$ represents any one of a hydrogen atom, a fluorine atom, and a methyl group;

$X^{106}$ represents a methyl group; and a total number of fluorine atom from $X^{101}$ to $X^{106}$ is less than or equal to 3.

2. A liquid crystal composition comprising the organic compound according to claim 1.

3. A liquid crystal element comprising the liquid crystal composition according to claim 2.

4. A liquid crystal display device comprising the liquid crystal element according to claim 3.

5. The organic compound according to claim 1, wherein the $Ar^{101}$ represents a cycloalkylene group.

6. The organic compound according to claim 1, wherein the $R^{101}$ represents an alkyl group having 1 to 11 carbon atoms.

7. The organic compound according to claim 1, wherein the organic compound is represented by a structural formula (200),

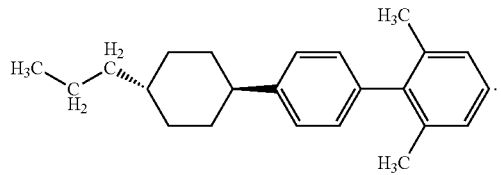

(200)

8. The organic compound according to claim 1, wherein the organic compound is represented by a structural formula (201),

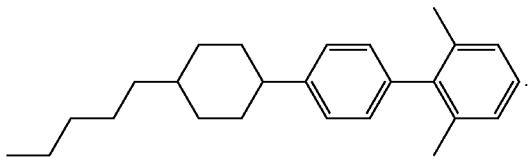

(201)

* * * * *